United States Patent [19]
Akeley

[11] Patent Number: 5,343,558
[45] Date of Patent: Aug. 30, 1994

[54] METHOD FOR SCAN CONVERTING SHADED TRIANGULAR POLYGONS

[75] Inventor: Kurt Akeley, Union City, Calif.

[73] Assignee: Silicon Graphics, Inc., Mountain View, Calif.

[21] Appl. No.: 657,087

[22] Filed: Feb. 19, 1991

[51] Int. Cl.⁵ .................. G06F 15/62; G06F 15/72
[52] U.S. Cl. ..................... 395/126; 395/143; 395/121
[58] Field of Search ............... 395/126, 121, 135, 143, 395/128; 340/729, 728, 744

[56] References Cited

U.S. PATENT DOCUMENTS

| | | | |
|---|---|---|---|
| 4,805,116 | 2/1989 | Liang et al. | 340/728 X |
| 4,819,192 | 4/1989 | Kuragano et al. | 395/121 |
| 4,862,391 | 8/1989 | Ohhashi | 395/126 |
| 4,873,515 | 10/1989 | Dickson et al. | 340/728 |
| 4,974,177 | 11/1990 | Nishiguchi | 395/125 |
| 5,036,316 | 7/1991 | Kemplin | 340/728 |
| 5,060,172 | 10/1991 | Engelse et al. | 395/143 |
| 5,123,085 | 6/1992 | Wells et al. | 395/121 |
| 5,163,127 | 11/1992 | Ikumi et al. | 395/126 |

Primary Examiner—Raymond J. Bayerl
Attorney, Agent, or Firm—Blakely, Sokoloff, Taylor & Zafman

[57] ABSTRACT

A method for scan converting a triangular polygon where information representative of parameter values at each vertex is provided. The method includes the step of selecting an edge of the triangular polygon which is designated as a major edge and calculating parameter values for a first pixel center adjacent to the major edge, and then moving to a next pixel center adjacent to the major edge and calculating parameter values for that next pixel center adjacent to the major edge. The method continues to find pixel centers adjacent to the major edge until all parameter values for pixel centers adjacent to the major edge have been calculated. Then, for each line parallel to an orthogonal axis of the display device which is intersected by the triangular polygon, the method interpolates parameter values for pixel centers within the triangle which have not been calculated by interpolating from the calculated parameter values for one pixel center for each line. Typically, a line is column or a scan line.

18 Claims, 15 Drawing Sheets

FIG. 7c
FIG. 7d
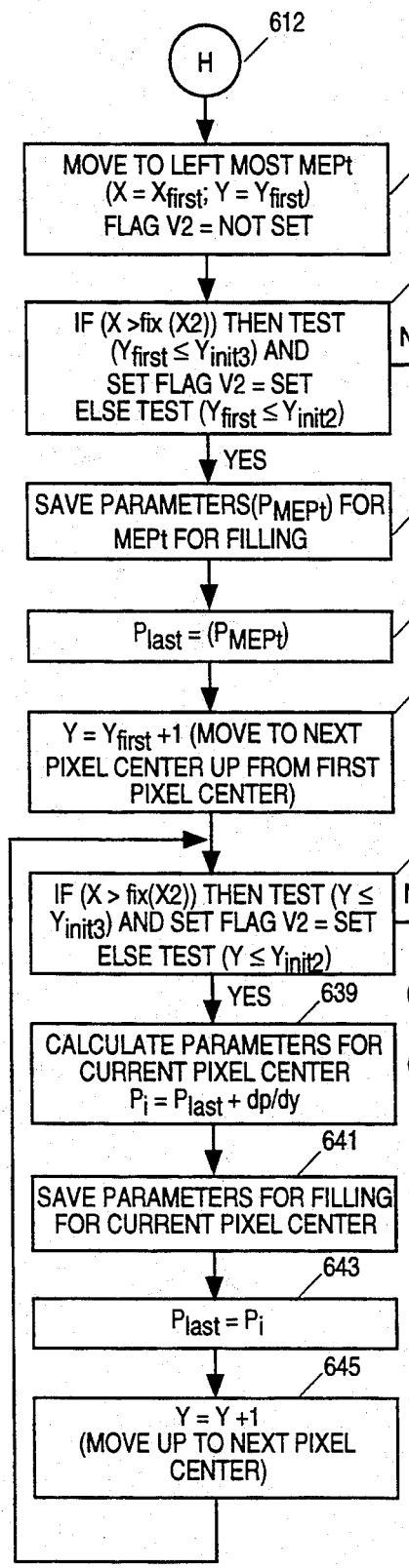
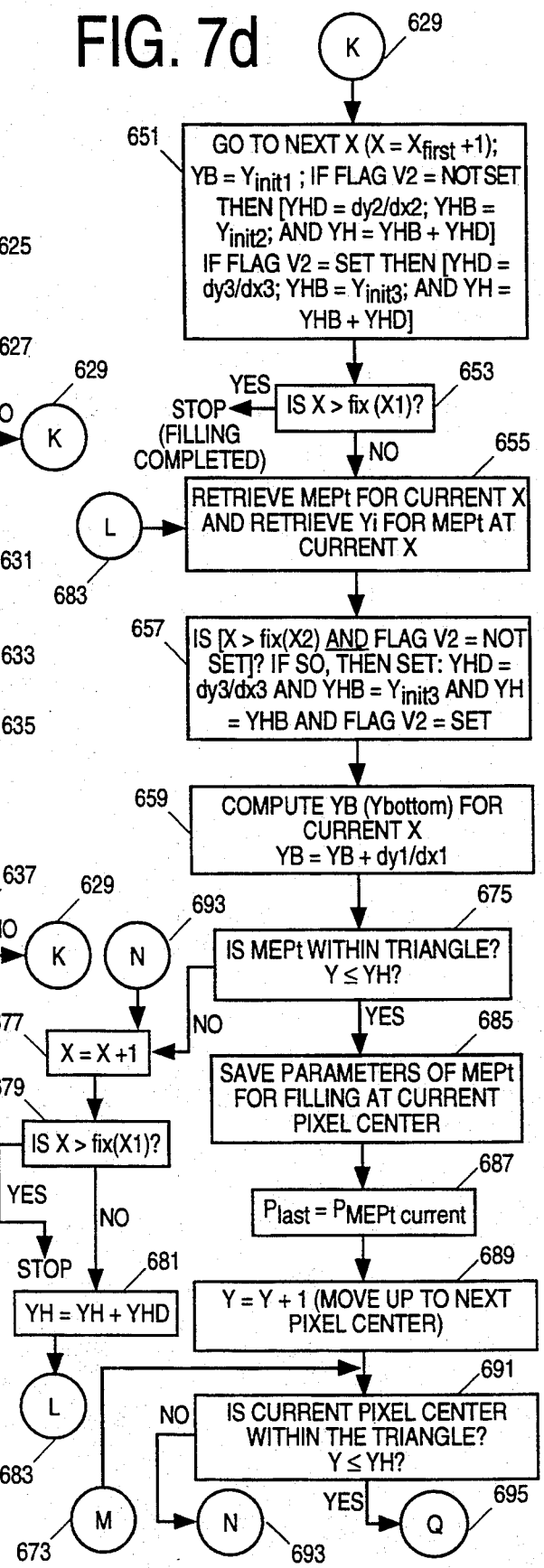

FIG. 7e
FIG. 7f
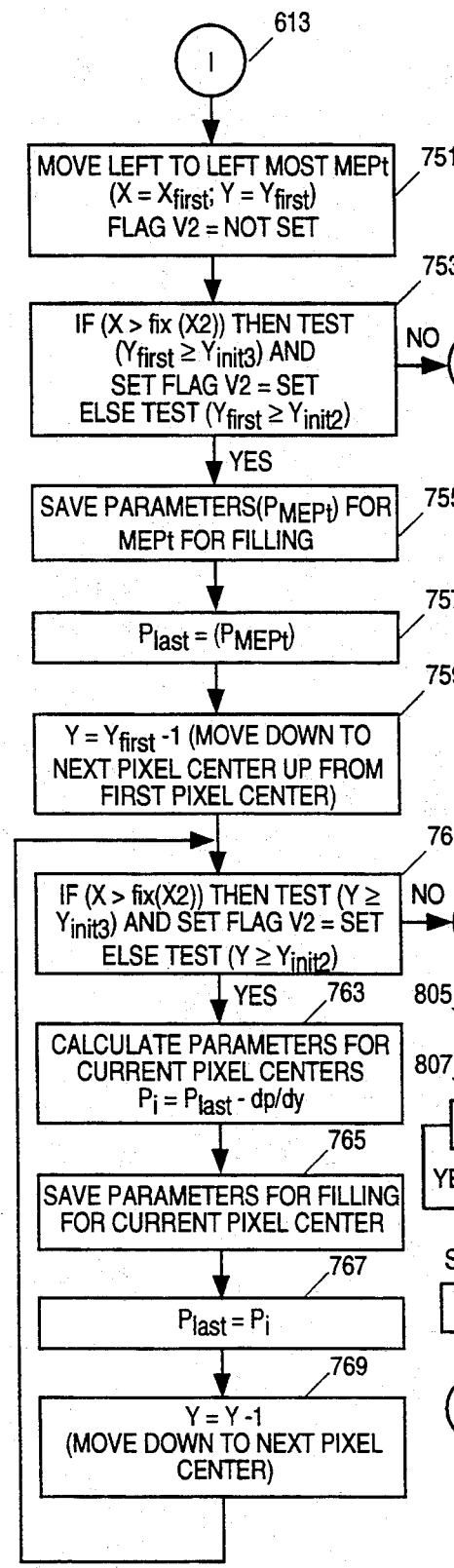
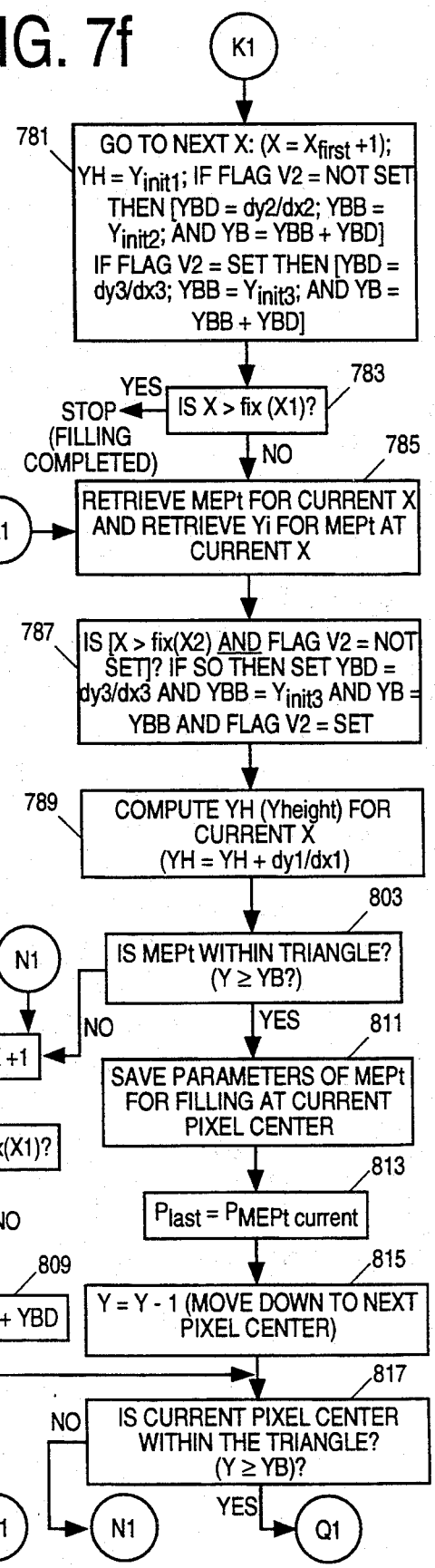

FIG. 7g
FIG. 7h
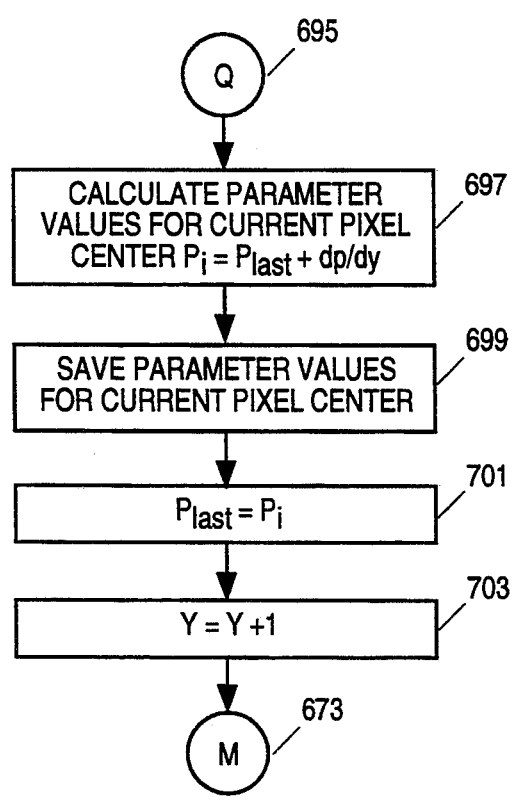
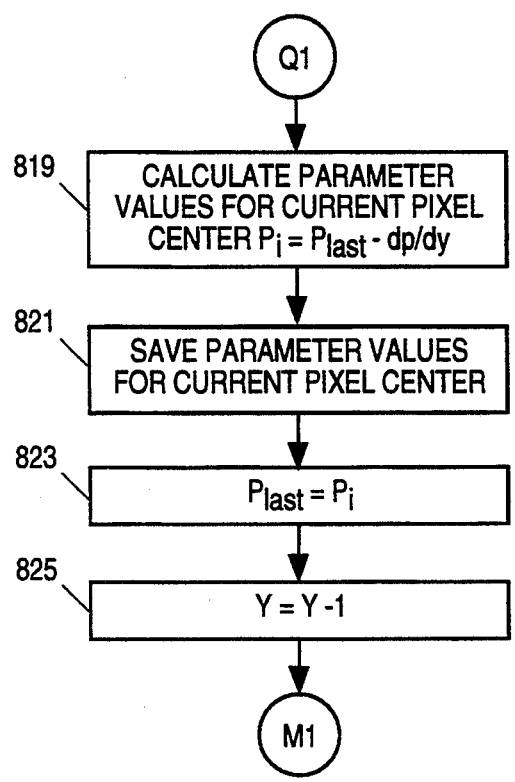

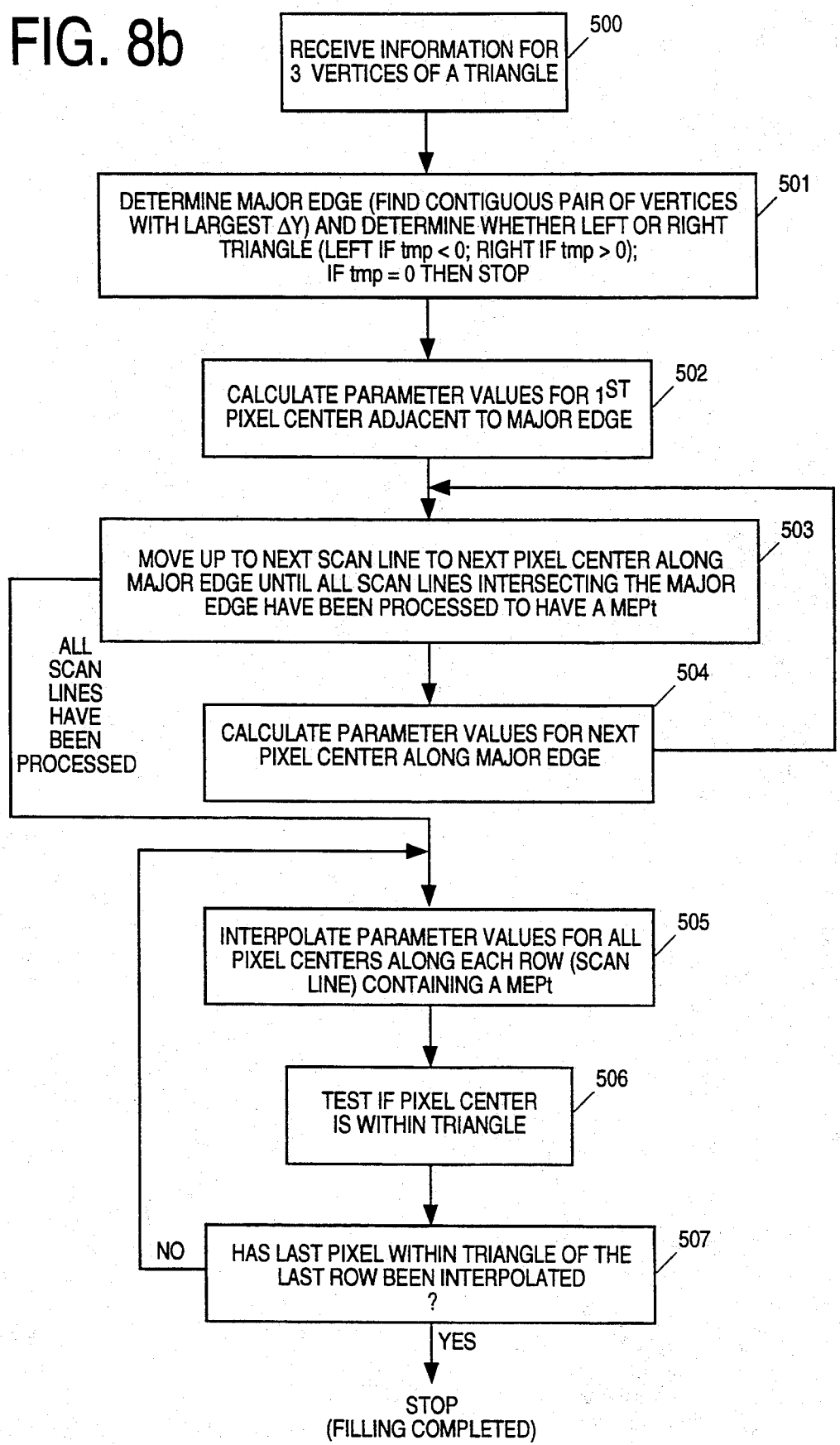

METHOD FOR SCAN CONVERTING SHADED TRIANGULAR POLYGONS

BACKGROUND Of THE INVENTION

1. Field of the Invention

The present invention relates to a method for displaying images in a computer controlled raster display system. More particularly, the present invention relates to an apparatus and method for scan converting shaded polygons and for determining the coverage of pixels in polygons in a computer controlled raster display system.

2. Prior Art

Many computer systems today are capable of displaying complex 3-dimensional curves and solids on display devices which are controlled by these computer systems. These complex 3-dimensional solids and curves are typically displayed interactively to allow the user to manipulate the object. Well known graphics techniques for rendering these 3-dimensional curves and solids, such as Gouraud shading, hidden surface algorithms, clipping, filling polygons and coordinate transformations are used in order to generate the displayed object on a display device, such as a CRT video display which is controlled by the computer system.

These various computer systems often rely on converting a polygon representation of the solid to a raster scanned image which is stored in the frame buffer of the computer system. In this circumstance, it will typically be necessary to convert from the vertices of the polygon which are calculated in the clipping and transformation manipulations to an array of parameter data which is stored in a frame buffer array at the resolution of the display device. In other words, it is necessary to convert from the specification of parameter values (e.g. color in the form of "RGB" or other representations of color and Z values and other useful parameters) at each vertex of a polygon to parameter values at each picture element (pixel) of the output display device. This task becomes difficult and computationally expensive when the polygon to be displayed is shaded such that the interior of the polygon includes parameter values and is not merely an outline of the border of the polygon. In this situation, the scan conversion process must fill all pixels within the polygon with appropriate parameter values from only the parameter values of the vertices of the polygon.

FIG. 1 represents a typical method of the prior art, which is briefly discussed at pages 398-399 of Newman and Sproull, *Principles of Interactive Computer Graphics*, McGraw Hill, 1979. In this technique, scan conversion and filling begins by receiving the parameter values at the vertices of the polygon, in this case a triangle as shown in FIG. 1. For example, the vertex V0 will have specified with it an X and Y value (X0 and Y0) and parameter values such as RGB and perhaps a Z value and other parameter values. Similarly, vertex V1 and V2 will also have parameter values associated with the locations of the vertices V1 and V2. It will be appreciated that the triangle shown in FIG. 1 is ready for scan conversion as it has been converted to the output device coordinate space at subpixel resolution; thus, for example the scan lines are shown as horizontal lines (rows) and the integer X values are shown as columns. A pixel center is assumed to be at the intersection of each row and column, for example as shown at $X=11$ and $Y=4$. It will be appreciated that each column is parallel to an orthogonal axis of the display device.

In the prior art methods for scan converting, parameter values are computed at both edges of a triangular polygon which intersect a particular scan line from the parameter values at the appropriate vertices. For example, for scan line $Y=6$, parameter values along the edge V0–V2 will be computed at location 12 (which is not a pixel center) and the parameter values for location 15 along edge V1–V2 will also be computed. These values along the edge of the polygon are computed by interpolating between the parameter values along the particular edge. For instance, locations 10, 11, and 12 have their parameter values computed by interpolating the parameter values for V0 and V2 in the well known manner. After interpolating the parameter values at all intersections of each edge of the polygon with all scan lines running through the polygon, then actual parameter values for pixel centers are then interpolated along each scan line by interpolating between the parameter values at the edges along that scan line. Thus for example, the parameter value for the pixel at 8,5 will be calculated by interpolating the parameter values at location 11 and 16 of FIG. 1.

In an alternative embodiment of the prior art method of scan converting filled polygons, parameter values at the intersections of each column with each edge are calculated and these values are used for interpolating parameter values at pixel centers along each column. Thus, parameter values at locations 21 and 22 would be calculated by interpolating from the parameter values at V0 and V2 for location 21 and from the parameter values at V0 and V1 for location 22 and then the parameter value at pixel center $X=3$, $Y=4$ would then be calculated by interpolating between the parameter values at locations 21 and 22.

It will be appreciated that considerable computational effort is required in order to first calculate parameter values along the edges of the polygons at each appropriate intersection. These calculations are somewhat wasteful because the values calculated are not themselves ultimately displayed but rather are used to calculate other values which will be ultimately displayed. This increased computational load on the computer system results in slower drawing of images to a display device. The present invention seeks to improve the method of scan converting filled polygons by avoiding the calculation of parameter values which are not themselves used for display.

After a parameter value is computed for a particular pixel center within a polygon, it may be necessary to modify the parameter value in order to make the appearance of the filled polygon on a display device satisfactory to a user. This is particularly true of pixel centers near edges of the polygons where the original parameter value of the pixel center clashes (e.g. very different colors) with a parameter value of a pixel center which is just outside of the filled polygon. This clashing of parameter values often results in the jagged appearance of the edges of a polygon, which makes the appearance of the polygon distorted on a display device of the computer system. This appearance is largely due to the fact that only a portion of the actual pixel is obscured by the polygon and it is also due to the fact that the pixel on the display device has an actual size rather than being an infinitely small dot.

Prior art techniques of determining the coverage of a pixel and of blending or anti-aliasing the pixel within a filled polygon have included numerous techniques which are typically cumbersome and are often inaccurate in determining the portion of the pixel obscured by the polygon (i.e. in determining coverage). It is an object of the present invention to provide an improved technique for determining the portion of the pixel obscured by the polygon to allow for improved blending and anti-aliasing of filled polygons to thereby improve the appearance of images displayed in the computer system of the invention.

SUMMARY OF THE INVENTION

The method of the present invention provides improved efficiency for scan converting a triangular polygon from parameter information at the vertices of the triangle in order to fill the interior of the triangle with parameter values representative of the pixel shades within the interior of the triangle. The method includes several steps, including: receiving information representative of parameter values at each vertex of the triangle; selecting an edge of the triangle, which selected edge is typically a major edge of the triangle; calculating a first parameter value for a first pixel which is adjacent to the selected edge; moving to a next pixel center adjacent to the selected edge; calculating parameter values for the next pixel center adjacent to the selected edge; repeating the steps of moving to a next pixel center and of calculating parameter values for the next pixel center until all parameter values for pixel centers adjacent to the selected edge have been calculated; and for each line parallel to an orthogonal axis of the display device, interpolating parameter values for pixel centers within the triangle which have not been calculated by interpolating from a set of calculated parameter values on each line.

In a typical embodiment of the method of the present invention for scan converting filled triangular polygons, the selected edge is the major edge of the triangle, which major edge is determined by the vertices which specify the longest edge relative to the X axis of the triangle. The pixel centers which are adjacent to the major edge are selected on the basis of being as close as possible to the major edge. These pixel centers which are adjacent to the major edge may be outside of the triangle, but this will not have an effect upon the ultimate result produced by the method of the present invention.

The present invention also includes a method for determining the coverage of pixel centers by the polygon in order to determine the amount of blending for each pixel center within a polygon. The method of the invention for determining the coverage by a polygon of a particular pixel center includes numerous steps, including determining a value representative of the distance from the currently sampled pixel center to each edge of the polygon; adding a predetermined value to each value representative of distance for the current pixel center; clamping each value of the distance (with its added predetermined value) for each currently sampled pixel center according to a function which returns the input of the function if the input is within a certain range and otherwise returns a value of one or zero if the input is out of that range; computing the coverage by computing the product of the clamped functions for the distances; blending the parameter values if the coverage is within a particular range and otherwise leaving the parameter values unmodified for the pixel center.

These and other aspects of the invention will be discussed with reference to the following figures.

DESCRIPTION OF THE DRAWINGS

FIGS. 7a, 7b, 7c, 7d, 7e, 7f, 7g, and 7h depict a detailed flow chart for the scan conversion and filling process of the present invention.

FIG. 8B shows a flowchart for the method of scan converting according to the present invention for scan conversion techniques which fill along scan lines.

DESCRIPTION OF THE INVENTION

Figure 3:
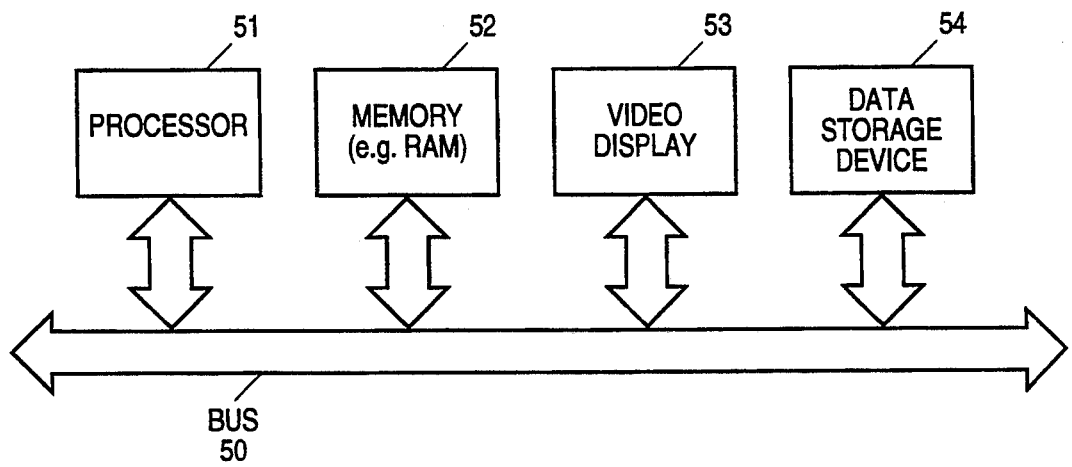
FIG. 3 is a generalized architectural diagram of a typical computer system which may be utilized with the present invention.
Figure 4:
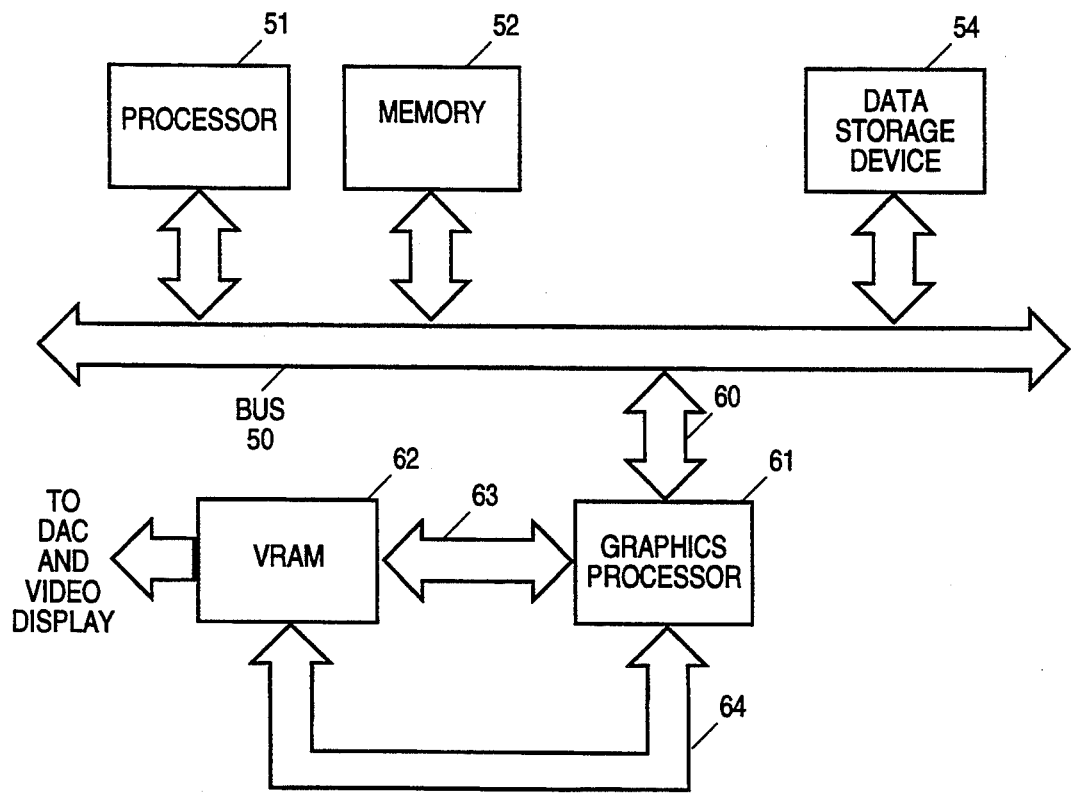
FIG. 4 shows an alternative computer system having a graphics subsystem and processor for performing scan conversion and other operations in connection with graphics processing.

The following detailed description of the present invention is made with reference to figures which show examples of the invention and which should not be taken as the exclusive way of performing the present invention. It will be appreciated by those of ordinary skill in the computer art that many different implementations of the method of the present invention are possible and that many different computer systems may be employed with the method of the present invention. FIGS. 3 and 4 show two alternative computer systems which may be employed with the present invention.

The computer system illustrated in FIG. 3 includes a bus 50 for communicating information, a processor 51 coupled with the bus 50 for processing information, a memory 52 such as RAM which is coupled with the bus 50 for storing information and instructions for the processor 51, and a data storage device 54, such as a magnetic disk coupled with the bus 50 for storing information and instructions. The computer system further includes a video display device 53, such as a CRT raster scan device.

Figure 1:
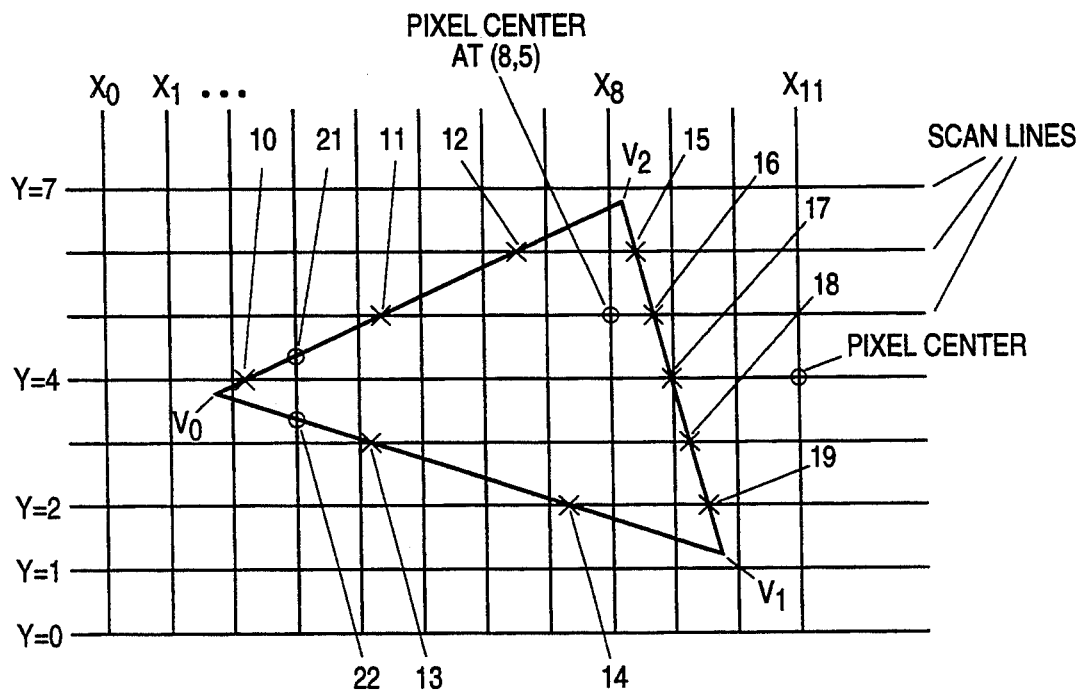
FIG. 1 shows a triangular polygon which is overlayed onto an output device coordinate space at subpixel resolution for the purpose of demonstrating the prior art scan conversion techniques.

Alternative computer systems utilizing specialized graphics engines (usually specialized hardware and software), are well known in the art. These systems typically modify the system shown in FIG. 1 by incorporating a specialized graphics subsystem which includes a graphics processor and a dedicated frame buffer, often in the form of video RAM, as well as a video display. Numerous computers from Silicon Graphics, Inc. of Mountain View, Calif. exemplify these alternative and commercially available computer systems with specialized graphics engines. Other such systems are well known. FIG. 4 shows an example of a computer system having a graphics subsystem. In these systems, image data from the main processor 51 is communicated over bus 50 and bus 60 to the graphics processor 61; this information is typically in the form of graphic primitives such as lines, points, polygons or character strings. The graphics processor 61 receives image data from the processor 51 and uses that image data to create an image which is rendered by using well known graphic techniques such as scan conversion, clipping, Gouraud shading and hidden surface algorithms. The resulting image is stored in video RAM 62 (which typically includes the well known frame buffer) by the graphics processor 61 addressing the video RAM 62 over the address bus 64 while supplying the video information over bus 63. Periodically, the output of the video RAM 62 is read out to a digital to analog (DAC) converter and then to a video display device or to other raster scan display devices. It will be appreciated that each scan line on the display device is parallel to an orthogonal axis of the display device.

The computer system such as that shown in FIG. 4 is more appropriate for graphics intensive processing, such as that required by the present invention, although the present invention may operate on other computer systems as well. It will be appreciated that the graphics processor 61 typically provides the function of scan conversion for filled polygons and thus the graphics processor 61 will receive the parameter information for the vertices of the polygon from the processor 51 although alternatively such information could also be calculated by the graphics processor 61.

Figure 2:
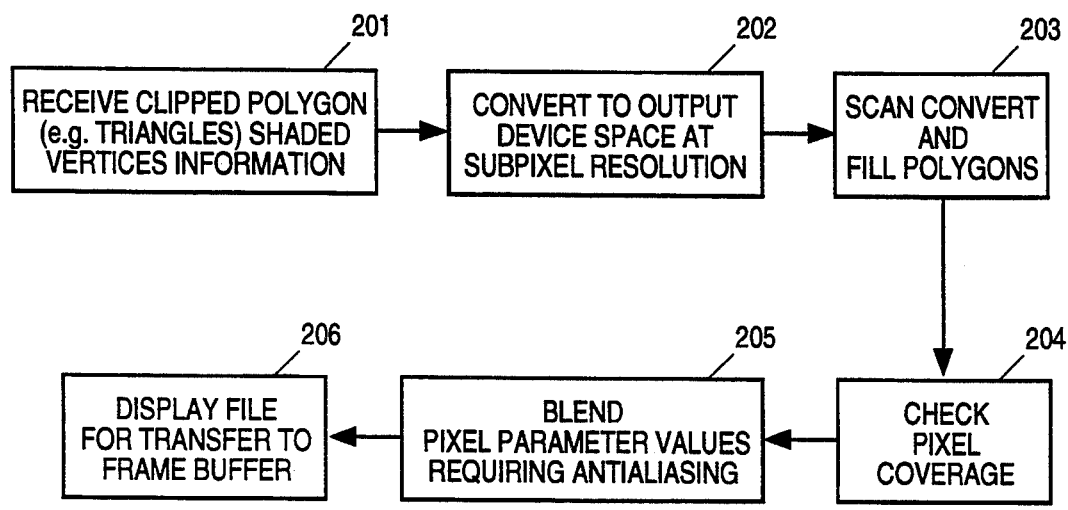
FIG. 2 shows an overall flow chart of the process of the invention.

An overview of the present invention will be described with reference to FIG. 2. Clipped polygon information in the form of parameter values for each vertex of a triangle is received by the processor which is performing scan conversion (step 201). The coordinate values for these vertices are then converted by well known transformation techniques to the output device coordinate space at subpixel resolution (step 202). Then in step 203, the scan conversion and filling of the polygons (triangles) occurs according to the method of the present invention. After determining the parameter values of each pixel center within the polygon (or alternatively while computing each parameter value for each pixel center within the polygon) the coverage by the polygon of the particular pixel center is determined in step 204. If this coverage indicates that the polygon only partially covers the pixel then blending of the pixel parameter values is performed in step 205 in order to improve the appearance of the polygon and particularly the edges of the polygon. Finally, in step 206 a display file is prepared for transfer to the frame buffer, which display file is typically a file containing the bit mapped image for the area covered by the polygon in the frame buffer.

Figure 5:
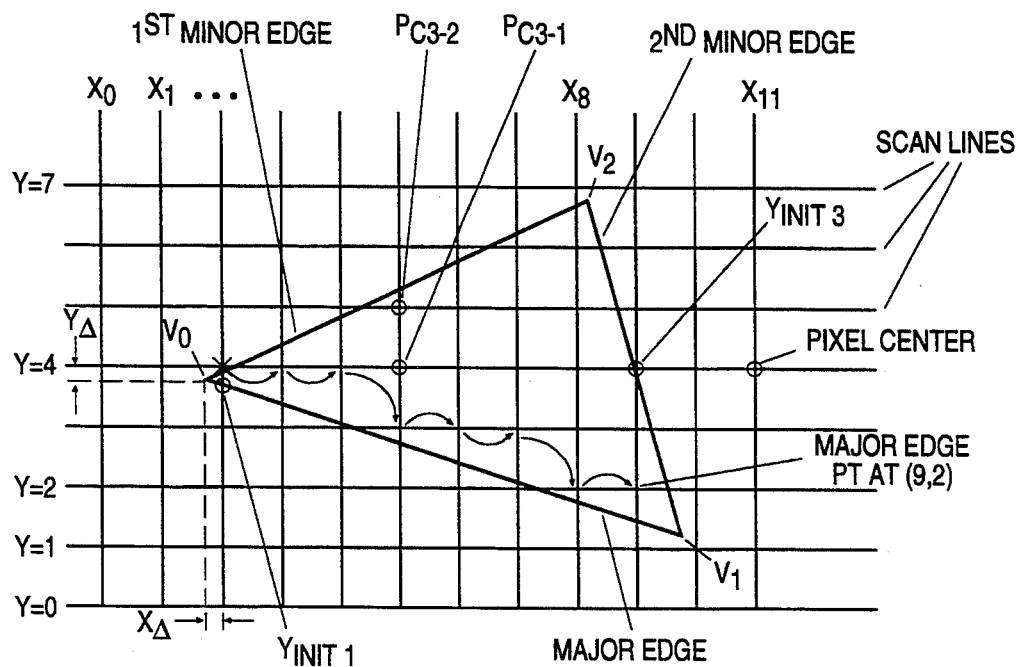
FIG. 5 shown an "up" triangular polygon as well as various values associate with calculations performed in the present invention.

The scan conversion and filling of the present invention will now be described by referring to FIGS. 5 and 6 which show an "up" triangle and "down" triangle respectively. As shown in FIG. 5, a triangular polygon represented by vertices V0, V1 and V2 has been converted into output device coordinate space at subpixel resolution and is now ready for scan conversion according to the method of the present invention. As with the convention previously described, pixel centers are at the intersection of scan lines and column lines. It will be appreciated that vertex V0 has associated with it certain parameter values, such as RGB, a Z value and perhaps other parameter values such as an alpha value. Similarly, vertices V1 and V2 will also have associated therewith similar parameter values. "P" is any one of the various parameter values (e.g., R, G, B, Z, $\alpha$, etc.). $P_0$ represents any one of the various parameter values of the vertex V0. As can be seen from the chart in FIG. 5 which shows the values along the major edge, the parameter value $P_0$ (which is actually any one of the various parameter values at the vertex V0) is used to calculate the various parameter values for each of the 8 major edge points which are shown in a chart of FIG. 5. The eight major edge points for the chart of FIG. 5 are as follows: (2,4), (3,4), (4,4), (5,3), (6,3), (7,3), (8,2), and (9,2).

The up triangle of FIG. 5 includes a major edge which is disposed between vertex V0 and vertex V1 and also includes a first minor edge between vertex V0 and V2 and a second minor edge between vertex V2 and V1. Certain values which are used in the method of the present invention are shown in FIG. 5; specifically, Yinit 1 and Yinit 3 are shown at points 2, 3.7 and 9, 4.1 respectively. Yinit 1 represents the Y value at the intersection of the major edge with the first column to the right of the vertex V0, and Yinit 3 represents the Y value of the intersection of the first column (going from left to right) with the second minor edge.

Figure 6:
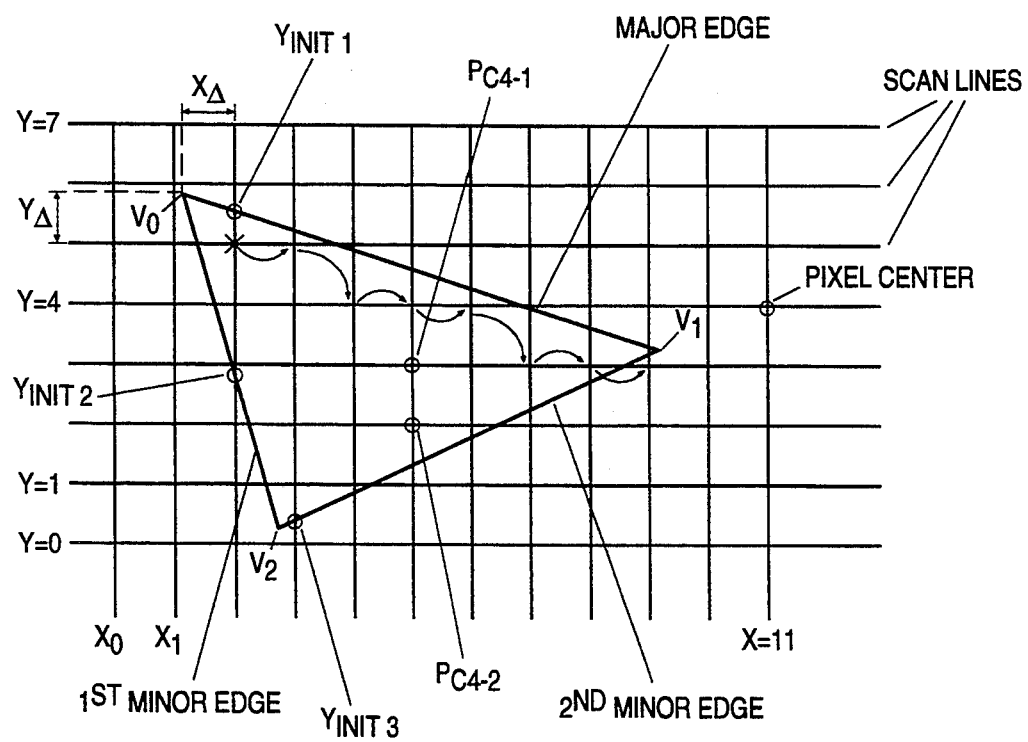
FIG. 6 shows a "down" triangular polygon which is being scanned converted according to the method of the present invention.

The down triangle shown in FIG. 6 has a major edge disposed between vertices V0 and V1 as well as a first minor edge between vertices V0 and V2 and a second minor edge between vertices V1 and V2. The locations of Yinit 1, Yinit2 and Yinit 3 for the triangle are shown in FIG. 6. The eight major edge points for the triangular polygon of FIG. 6 are shown in a chart of FIG. 6 and the equations for computing the parameter values along the major edge are also shown on FIG. 6.

One important feature of the present invention involves the observation that for each parameter (e.g. the red color value) there is a parameter planar surface which may be thought of as being above the triangular polygon because each vertex may be thought of as providing a parameter height (e.g. the amount of red) above a planar surface which includes the triangle in that plane, which height represents the parameter value at that vertex. Since three points specify a plane, the three parameter height values (for a particular parameter, e.g. red) specify a parameter planar surface above the triangle for this particular parameter. This triangular planar surface is conceptually used to determine rates of change of the parameter values through the triangle, which rates of change are not limited to a particular edge, as in the prior art techniques. The area of the triangle is actually used to calculate the rates of change. The psuedo-code which is presented below uses this observation in order to compute the dp/dx and the dp/dy values (the rates of change) for each parameter.

The process of the present invention will now be described in detail by referring to FIG. 7a, 7b, 7c, 7d, and 7g along with FIG. 5; this description will be for the process of the present invention as applied to an up triangle and later a description of the invention as applied to a down triangle will be provided. Beginning in step 601, information for three shaded vertices of the triangle is received by the scan converting system. In step 602, the major edge is determined; often, this step is an implicit sorting of information such that the vertices are sorted to provide the left most vertex of the major edge and then the right most vertex of the major edge and finally the remaining vertex (labelled V2). The major edge is determined by finding the contiguous pair of vertices which has the largest difference in their values of X (if there is a tie, then arbitrarily pick one pair). Step 603 follows step 602 and it involves the determination of whether the triangle is an up or down triangle; in the psuedo-code presented below, the test is performed by determining the sign of the value "tmp". An up triangle has a positive value for tmp, and the vertex (shown as V2) which is not part of the major edge is above major edge. A down triangle has a negative value for tmp, and the vertex (shown as V2) which is not part of the major edge is below the major edge. If the triangle is neither up or down (tmp=0) then the triangle has no area and consequently no filing can occur. Step 603 includes a test to determine if tmp=0 and also tests if fix (x0)=fix (x1); if either of these is true, then the method is finished for the current triangle because no filing of that triangle can occur. In step 604, the rates of change for the various parameters are calculated for the triangle with respect to X and Y. Then in step 605, the parameter values for the first pixel (having coordinates at X first and Y first) are computed. Thus, for the example shown in FIG. 5, the parameter values for the first pixel along the major edge are computed, which pixel is at location 2, 4; it should be noted that this pixel location is outside of the triangle (unlike prior art methods) but that this will not affect the processing. This is a result of the use of the parameter planar surface above the triangle which will maintain a constant slope with respect to the parameter value and hence being outside of the polygon and using values outside of the polygon will not interfere with the computation of parameter values within the polygon. As shown in FIG. 5, the value of any one of the various parameters for the first pixel is computed by calculating P0+dp/dx*dxfirst+dp/dy*dyfirst. For example, given that $X_{first}=2$ and $Y_{first}=4$, the values for $X_\Delta$ and $Y_\Delta$ are calculated as $X_\Delta=$dxfirst=0.3 and $Y_\Delta=$dyfirst=0.2; $Y_{init1}=3.7$, $Y_{init2}=3.9$, and $Y_{init3}=4.1$. The coordinates for the vertext V0 is $X_0=1.7$ and $Y_0=3.8$; and n=−1. An example of an implementation of processing steps 603, 604 and 605 is shown below in pseudo-code which has been annotated to further describe the invention.

1. compute the delta values along the edges
dx1=x1−x0
dx2=x2−x0
dx3=x3−x1
dy1=y1−y0
dy2=y2−y0
dy3=y2−y1
dz1=z1−z0
dz2=z2−z0
dr1=r1−r0
dr2=r2−r0
dg1=g1−g0
dg2=g2−g0
db1=b1−b0
db2=b2−b0
da1=a1−a0
da2=a2−a0

Note: Vertex V0 at X0, Y0 has parameter values (r0, g0, b0, z0, a0); vertex V1 at X1, Y1 has parameter values (r1, g1, b1, z1, a1); and vertex V2 at X2, Y2 has parameter values (r2, g2, b2, z2, a2).

2. compute parameter slope reciprocal
tmp=(dx1*dy2)−(dx2*dy1)
(sign of tmp determines whether up or down triangle);
 a positive tmp indicates an up triangle and a negative tmp indicates a down triangle
(if tmp is zero, triangle has no area and cannot be filled)
R=1/tmp 3. compute parameter x slopes
tmp0=dy2*R
tmp1=dy1*R
dzdx=(tmp0*dz1)−(tmp1*dz2)
drdx=(tmp0*dr1)−(tmp1*dr2)
dgdx=(tmp0*dg1)−(tmp1*dg2)
dbdx=(tmp0*db1)−(tmp1*db2)
dadx=(tmp0*da1)−(tmp1*da2)

4. compute parameter y slopes
tmp0=dx2*R
tmp1=dx1*R
dzdy=(tmp1*dz2)−(tmp0*dz1)
drdy=(tmp1*dr2)−(tmp0*dr1)
dgdy=(tmp1*dg2)−(tmp0*dg1)
dbdy=(tmp1*db2)−(tmp0*db1)
dady=(tmp1*da2)−(tmp0*da1)

5. compute dy/dx along each edge
dydx1=dy1*(1/dx1)
dydx2=dy2*(1/dx2)
dydx3=dy3*(1/dx3)

Note: in this psuedo-code, derivatives are written without a slash, so $$\frac{dr}{dx}$$

is written as drdx; it will be understood that $$\frac{dr}{dx} = \frac{\Delta r}{\Delta x} = drdx.$$

It will also be understood that $$\frac{dp}{dx}$$

represents any one of drdx, dgdx, dbdx, dzdx, or dadx.

6. compute x of first pixel xfirst=float (fix(x0+ALMOSTONE))
(Note: ALMOSTONE is 0.999 . . . )
7. compute y of first pixel
dxfirst=xfirst−x0
yinit1=y0+dydx1*dxfirst
if tmp>0
  yfirst=float (fix(yinit1+ALMOSTONE)) else
  yfirst=float (fix(yinit1−ALMOSTZERO))
Note: the value of y at the first column intersection of the major edge is computed in this step and is "yinit1".
8. compute parameter values of first pixel
dyfirst=yfirst−y0
zfirst=z0+dxfirst*dzdx+dyfirst*dzdy
rfirst=r0+dxfirst*drdx+dyfirst*drdy
gfirst=g0+dxfirst*dgdx+dyfirst*dgdy
bfirst=b0+dxfirst*dbdx+dyfirst*dbdy
afirst=a0+dxfirst*dadx+dyfirst*dady
Note: in the figures, a shorthand expression (e.g.

$$P_{(2,4)} = P_0(X_0,Y_0) + \frac{dp}{dx} X\Delta + \frac{dp}{dy} Y\Delta$$

is shown rather than all 5 (of the last 6) equations shown in part 8 here.
9. compute integer y slopes along major edge
n=intdydx1=float (fix(dydx1))
10. compute two iteration slopes/parameter
iterz1=intdydx1*dzdy+dzdx
iterz2=iterz1+dzdy
iterr1=intdydx1*drdy+drdx
iterr2=iterr1+drdy
iterg1=intdydx1*dgdy+dgdx
iterg2=iterg1+dgdy
iterb1=intdydx1*dbdy+dbdx
iterb2=iterb1+dbdy
itera1=intdydx1*dady+dadx
itera2=itera1+dady
Note:

$$iterp1 = \frac{dp}{dx} + (n)\frac{dp}{dy} \; ; \; iterp2 = \frac{dp}{dx} + (n + 1)\frac{dp}{dy},$$

where P is any one of the parameters Z, r, g, b, or a.
11. compute initial y of first minor edge
yinit2=y0+dydx2*dxfirst
Note: the value of y at the first column intersection (going left to right) on the first minor edge is computed in this step and is "yinit2".
12. compute initial y of second minor edge (i.e. the value of y at the first column intersection going from left to right on the second minor edge is computed)
xsecond=float (fix(x2+ALMOSTONE))
dxsecond=xsecond−x2
yinit3=y2+dydx3*dxsecond The function "fix" is the integer result, rounded to minus infinity, of the input. This function is used in several steps in the psuedo-code noted above. The slopes of the various parameters (e.g. RGB) with respect to X and with respect to Y are computed in steps 3 and 4 of the psuedo-code. The computation of the parameter values for the first pixel (step 605 of FIG. 7a) is performed in step 8 of the psuedo-code presented above. The value of n which used in the computation of parameter values along the major edge is computed in step 9 of the psuedo-code. The function "float" merely instructs the computer to go back to floating point arithmetic after deriving an integer result from the "fix" function. It is noted after step 10 that for each parameter there are two iteration values which are computed; the use of these two iteration values is shown in the computation of the parameter value for pixel 4,4 in FIG. 5 and the pixel 5,3 in FIG. 5. In particular, note that the pixel at 5,3 is computed by adding to P (4,4) an iteration value of "Iterp1" while the iteration value added to compute the pixel at 4,4 is "Iterp2". The quantity "tmp" is twice the signed area of the triangle. Thus, for example, a triangle having vertices 0,4 (v0), 4,0 (v1) and 0,0 (v2) has a value of −16 for tmp; it can be seen that this triangle is a down triangle (thus a negative tmp) and has an area of 8. It can be seen that tmp is used to determine the parameter rates of change.

Figure 7A:
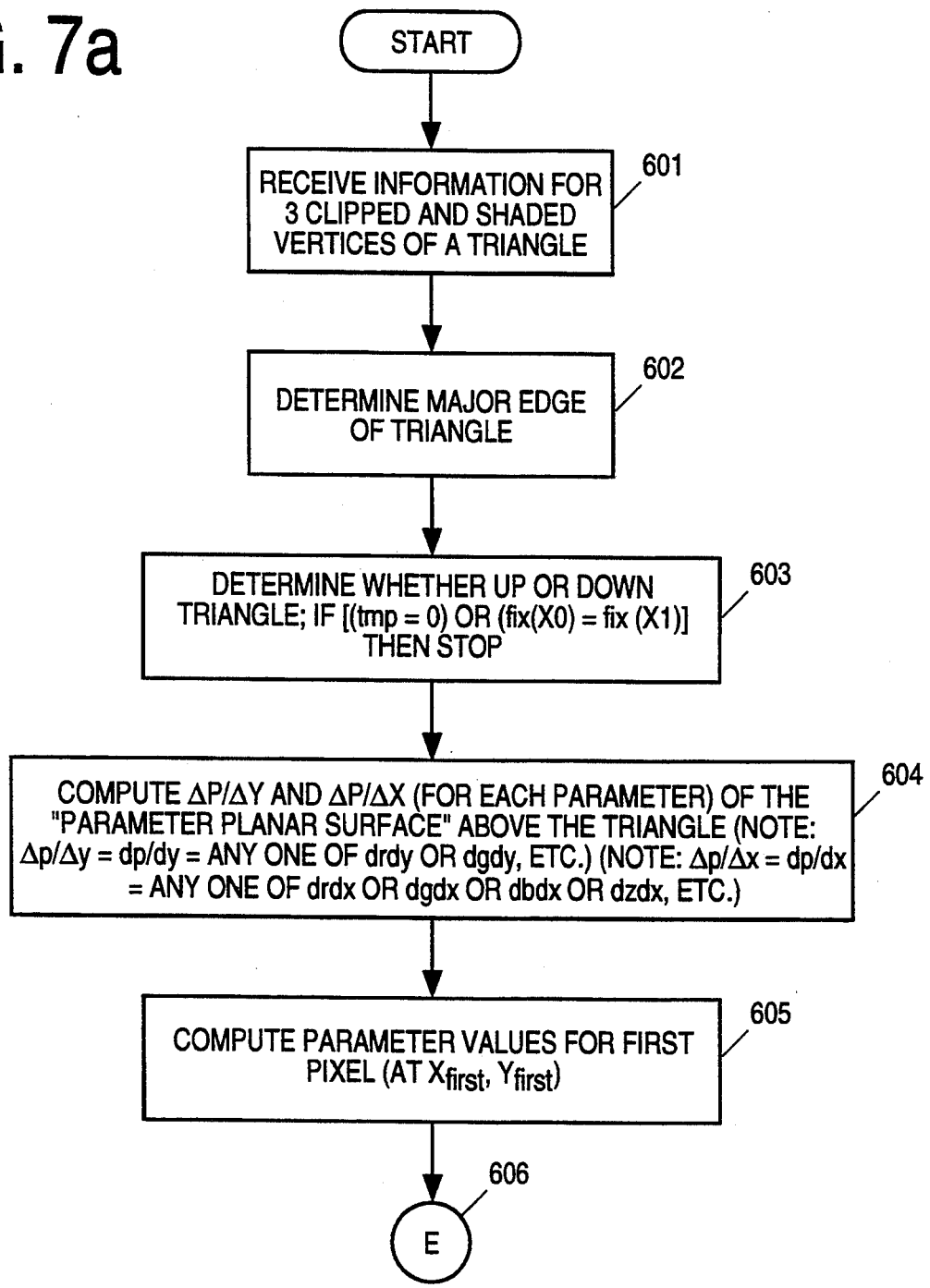
Figure 7B:
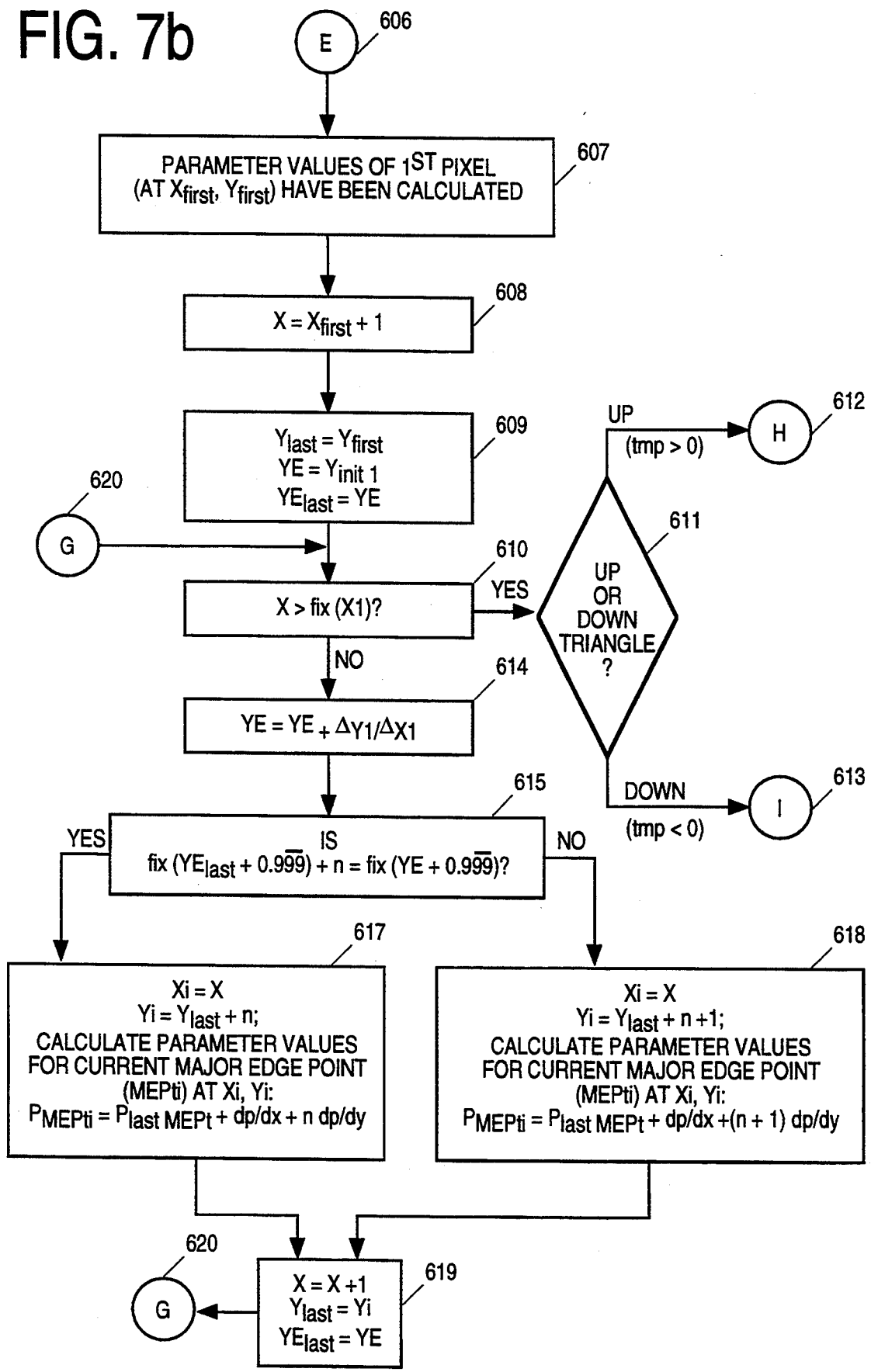

Following the computation of the parameter values for the first pixel which is adjacent to the left most vertex of the major edge, the method of the invention proceeds to step 608 in FIG. 7b which causes processing to move to the next column by adding 1 to the value of xfirst. Somewhere along this next column the next pixel center will be found and this process is repeated for each column as the process "walks" along the major edge. This walking is performed in such a manner that the major edge points are as close as possible to the major edge in a typical embodiment and will always allow for filling of the triangle in an upward direction for an up triangle or in a downward direction for a down triangle. The walking along the major edge of FIG. 5 is shown by the arrows which jump from the first pixel at 2,4 (first major edge point) to the second pixel at 3,4 (second major edge point) to the third pixel at 4,4 to the fourth pixel at 5,3 and then to the fifth pixel at 6,3 and then to the sixth pixel at 7,3 and so on. The parameter values for each major edge point are computed as the process walks along the major edge. This computation is carried out in steps 617 or 618 depending upon whether or not the iteration value added to the prior parameter value is "Iterp1" or "Iterp2". Movement from major edge point to major edge point along the major edge and the computation of parameter values for the major edge points continues until the current value of X exceeds the integer value of X for the right most vertex, which is X1. When this occurs, as detected in step 610, the walking along the major edge ends and the process continues by interpolating up or down the triangle depending on whether or not the triangle is an up or down triangle as determined in step 611 of FIG. 7b. As shown in FIG. 7b, an up triangle occurs when the variable "tmp" is greater than zero, in which case processing branches to node H (which has been numbered with the reference numeral 612); the variable tmp is defined in step 2 of the psuedo-code presented above. If the triangle is a down triangle then processing proceeds to node I (labeled 613).

The logic contained within steps 609, 610, 614, 615, 617, 618 and 619 assures that the walk along the major edge (i.e. the selection of major edge points) will be as close as possible to the major edge while remaining above the major edge (in the case of an up triangle) or below the major edge (in the case of a down triangle) and will assure that a major edge point can be used to fill all pixel centers within the triangle above the major edge (in the case of an up triangle) or below the major edge point (in the case of a down triangle). Thus, for example, the point at 5,4 in FIG. 5 would not be selected as a major edge point because in interpolating upwards from this point, the point 5,3 would be missed. It will appreciated that only one major edge point is computed for each column and that the process proceeds left to right. After the first pixel has been calculated, initialization of certain variables occurs in step 609. It will be appreciated that the variable YE is the value of Y along the major edge, which value is updated as the process moves from major edge point to the next major edge point (this updating occurs in step 614). In step 615, a test is performed to determine whether, in moving from the last major edge point to the next major edge point, the number of rows (scan lines) crossed by the major edge is the absolute value of n or the absolute value of (n+1). It can be seen from FIG. 5 that in moving from the first pixel at 2,4 to the second major edge point 3,4, the major edge does not cross a row and hence the iteration value associated with "n+1" is used to update the value of Y and to calculate the parameter value for the pixel at 3,4 (note that n+1=0 in the case of FIG. 5); in other words, in moving from major edge point 2,4 to major edge point 3,4, step 615 selects step 618 so that the current value of Y for the current major edge point remains equal to Y for the last major edge point and the parameter values for the pixel 3,4 are computed as shown in FIG. 5 (according to the equation set forth in step 618). A similar result occurs in moving from major edge point at 3,4 to major edge point at 4,4. After computing the new value of Y for the current major edge point and after computing the parameter values for the current major edge point, the value of X is updated to move to the next column in step 619 and the values of Y last and YE last are updated and processing loops back to step 610 which determines whether or not the walking along the major edge has crossed beyond the right most vertex of the triangle. Processing continues along the major edge through step 614 and again into step 615. It can be seen that step 615 selects step 617 when crossing from major edge point 4,4 to major edge point 5,3. The processing continues for all major edge points until the decision at step 610 indicates that the current value of X exceeds the integer value of X1, which is the integer X value of the right most vertex. The values of the points along the major edge is described by the equations given below.

TABLE 1

Equations for Values Along the Major Edge $$P_{(2,4)} = P_0(X_0, Y_0) + \frac{dp}{dx} X_\Delta + \frac{dp}{dy} Y_\Delta$$

$$P_{(3,4)} = P_{(2,4)} + \frac{dp}{dx} + (n + 1)\frac{dp}{dy}$$

$$P_{(4,4)} = P_{(3,4)} + \frac{dp}{dx} + (n + 1)\frac{dp}{dy}$$

$$P_{(5,3)} = P_{(4,4)} + \frac{dp}{dx} + (n)\frac{dp}{dy}$$

$$P_{(6,3)} = P_{(5,3)} + \frac{dp}{dx} + (n + 1)\frac{dp}{dy}$$

$$P_{(7,3)} = P_{(6,3)} + \frac{dp}{dx} + (n + 1)\frac{dp}{dy}$$

$$P_{(8,2)} = P_{(7,3)} + \frac{dp}{dx} + (n)\frac{dp}{dy}$$

$$P_{(9,2)} = P_{(8,2)} + \frac{dp}{dx} + (n + 1)\frac{dp}{dy}$$

The process of the invention continues by interpolating up the triangle shown in FIG. 5 from each major edge point on each column. Thus, for example, the major edge point at 5,3 will be used to compute parameter values for the pixel centers on the same column within the triangle, which pixels centers are at 5,4 and 5,5. This calculation is an interpolation from the value of the parameters at the major edge point on this column, as shown in FIG. 5. For example, interpolation up column 3 (i.e., C3), yields:

$$P_{(5,4)} = P_{C3-1} = P_{(5,3)} + \frac{dp}{dy} \text{ and}$$

$$P_{(5,5)} = P_{C3-2} = P_{(5,4)} + \frac{dp}{dy}.$$

The interpolation of parameter values from major edge points for an up triangle begins in step 625 where the values of X and Y are reset to the first major edge point, which is the left most major edge point. A flag (Flag v2) is initialized at Not Set; this flag indicates whether processing of columns has gone beyond V2.

Processing proceeds to step 627 in which it is determined whether or not the first pixel (first major edge point) is within the triangle. If it is not within the triangle, then processing proceeds to step 651 which increments X to the next column and initializes certain height (YH) and base (YB) values within the triangle, which values are used to compute whether pixel centers are within the triangle. The test performed in step 627 to determine whether the first pixel is within the triangle depends on whether X is greater than the integer value of X2. If X is greater than the integer of X2 then the proper test is whether yfirst is less than or equal to Yinit3; in this circumstance the Flag V2 is set to its "Set" state to indicate that processing from left to right has passed the vertex V2 (this circumstance occurs when the 1st column in the triangle is to the right of V2). If X is less than the integer of X2, then the proper test is whether yfirst is less than or equal to Yinit 2 (in this case the Flag V2 is left in the "Not Set" state). The appropriate test indicates a "yes" if y is less than or equal Yinit 2 (if X<fix(x2)) or Yinit 3 (if X>fix(x2)). It will be appreciated that step 627 is determining whether the first major edge point is below the height of the up triangle [defined by either the 1st minor edge (if X<fix(x2)) or the second minor edge (if X>fix(x2))].

If the first major edge point is within the triangle, processing proceeds to step 631 in which the parameters for the first major edge point are saved for filling. These parameter values may be saved in an array table or other means for storing the parameters. Alternatively, the parameters could be modified according to conventional blending techniques if the coverage determined by an aspect of the present invention (which is described below) indicates that some blending of the parameter values is required. From step 631, processing proceeds to steps 633 and 635, which cause the process to move up to the next pixel center from the first pixel center (along the same column). Step 637 determines whether the current pixel center which was moved up to in step 635 is within the triangle's border; if not, then processing proceeds to step 651 through node K. The test performed in step 637 to determine whether the current pixel center is within the triangle depends on whether X is greater than the integer value of X2; it can be seen that step 637 operates in a similar fashion as step 627. If the current pixel center is within the triangle's border, then processing proceeds to step 639 where the parameter values for this pixel center are computed. The interpolation up a column according to the present invention merely adds the value of dp/dy to the last parameter value. Then, in step 641, the parameter values for the current pixel center are saved for filling. Then processing moves to the next pixel center up the current column by performing steps 643 and 645 and processing continues through step 637 until all pixel centers within the triangle on the current column have their parameter values computed. It will appreciated that steps 637, 639, 641, 643 and 645 are interpolating parameter values for pixel centers along the first column from the first pixel (first major edge point) of the triangle. It can be seen from FIG. 5 that sometimes, this first pixel is not itself within the triangle and hence no interpolation up the associated column occurs; thus, for the triangle shown in FIG. 5 processing would proceed from step 625 to step 627 and then to step 651.

The steps 651 through 703 perform the interpolation of parameter values from the parameter values of each major edge point along each column of the triangle (except for the first column). Step 651 calculates certain height related values (which indicate the height of the first minor edge or second minor edge at the current column), which values depend on whether the first minor edge or the second minor edge provides the top of the triangle at the current column. If the Flag V2 has been set, then the height is specified by the second minor edge, and if the Flag V2 has not been set ("Not set" state) then the height is specified by the first minor edge). Step 653 follows step 651 and determines whether the interpolation process should stop because the current column location is greater than the integer value of X for the right most vertex; if not, processing continues to step 655 in which the major edge point parameters and coordinate values are retrieved for the current column (X). In step 657 the process determines whether the current value of X has moved beyond vertex V2 for the first time so that the values of the height within the triangle need to be recomputed on the basis of the second minor edge. Thus, as shown in FIG. 5, as the process of the invention moves from X=8 to X=9 the current value for YH will change as shown in step 657 to take into account the fact that filling up a column must change according to the new upper border for the triangle which is the second minor edge. Step 657 will determine whether the current column is beyond V2 for the first time by testing for the combination of the conditions X>fix(X2) and Flag V2=Not Set. Step 657 will not perform its initialization at all if the Flag V2 was set in steps 627 or 637. It is also noted that step 657 sets the Flag V2 if the initialization within the step is performed and thus this initialization will occur only once. In step 659, the current value for the bottom of the triangle is computed for the current value of X and then in step 675 it is determined whether the current major edge point is within the triangle. Specifically, in step 675 it is determined whether the current major edge point is below the current height for the triangle. Step 659 may be omitted, but the current bottom value is useful to have should it be decided to modify the method of the invention to allow major edge points to be below the major edge in the case of an up triangle; in this case, the current bottom value can be used to determine if the pixel center is below the major edge. The method of the invention (particularly steps 609, 614 and 615) guarantee that the major edge points will be above the major edge.

If, while on a particular column the major edge point is within the triangle as determined by step 675, then processing proceeds to step 685 where the parameter values of the major edge point for the current column are saved for filling of the current pixel center; it will of course be appreciated that these parameter values may be modified as determined by the coverage value which is computed as another aspect of the present invention (described below). After step 685, processing proceeds to step 687 in which the last parameter variable is updated to be equal to the current parameter values for the current major edge point and then the process continues up to the next pixel center along the current column (current value of X) by incrementing Y by 1 (step 689). In step 691, it is determined whether the current pixel location is within the triangle by determining whether the value of Y for that location is less than the height of the triangle. If it is, then processing proceeds to step 697 in which the parameter values are calculated for the current pixel center by adding the dp/dy value to the parameter values for the last pixel center. It will be appreciated that step 697 is responsible for calculating parameter values of all non-major edge points up each column for each column after the first column, and step 639 does this for pixels in the first column. After computing the parameter value in step 697, it may be desirable to calculate the coverage by the triangle of the pixel center and to modify and then save those modified parameter values as described below or alternatively the current parameter values may be saved in step 699 and then processing proceeds up to the next pixel center on the current column through steps 701 and 703, which cause looping back to step 691 through node M.

In step 691, it is determined whether the current pixel location is within the triangle by testing whether that current Y value is below the height of the triangle. If the current Y value is above the height of the triangle, then processing proceeds to step 677 which causes the process to move to the next column, which step also occurs if the major edge point for the column has a Y value which exceeds the height of the triangle (step 675). If step 677 is selected, then the current X value is tested in step 679 to determine whether or not the current column is beyond the integer value of X for the right most vertex of the triangle, in which case processing stops; otherwise, processing proceeds to step 681 in which the height of the triangle is updated and then processing proceeds back to step 655 where the next major edge point is retrieved and processing continues for the major edge point as described above through steps 657 and 675.

The interpolation process of the invention for a down triangle is shown in steps 751 through 825 of FIGS. 7e, 7f, and 7h. It will be appreciated that these processing steps are very similar to the steps performed for the interpolation of an up triangle with certain modifications being made to the process in order to conform to the geometry of a down triangle. Specifically, the values for the base (YB) will have to be modified to conform with the geometry of a down triangle and the movement to the next pixel center along a particular column will occur by subtracting the value of one in order to move down from the major edge, as shown in FIG. 6. As shown in FIG. 6, $X_{first}=2$ and $Y_{first}=5$, $X_A=dxfirst=0.9$ and $Y_A=dyfirst=-0.9$, and $Y_{init1}=5.6$, $Y_{init2}=2.8$, and $Y_{init3}=0.4$. The coordinates for $V_0=(1.1, 5.9)$ and $n=-1$. Similarly, the interpolation along a particular column will merely modify the last parameter value by subtracting (rather than adding) the value of dp/dy. For instance, the parameter value at pixel location 5,3 shown in FIG. 6 will be computed by subtracting dp/dy from the parameter values at the major edge point 5,4, as shown in FIG. 6. It will also be appreciated that the walk along the major edge and the determination of parameter values for pixel centers along the major edge are performed in the same manner as for the up triangle according to the process steps 608, 609, 610, 614, 615, (617 or 618), and 619. Thus, the major edge points of the down triangle shown in FIG. 6 are determined to be as follows: (2,5), (3,5), (4,4), (5,4), (6,4), (7,3), (8,3), and (9,3). The equations for calculating the values along the major edge corresponding to these points are given by Table 2 shown below.

TABLE 2

Equations for Values Along the Major Edge $$P_{(2,5)} = P_{0(X_0,Y_0)} + \frac{dp}{dx} X_\Delta + \frac{dp}{dy} Y_\Delta$$

$$P_{(3,5)} = P_{(2,5)} + \frac{dp}{dx} + (n+1)\frac{dp}{dy}$$

$$P_{(4,4)} = P_{(3,5)} + \frac{dp}{dx} + (n)\frac{dp}{dy}$$

$$P_{(5,4)} = P_{(4,4)} + \frac{dp}{dx} + (n+1)\frac{dp}{dy}$$

$$P_{(6,4)} = P_{(5,4)} + \frac{dp}{dx} + (n+1)\frac{dp}{dy}$$

$$P_{(7,3)} = P_{(6,4)} + \frac{dp}{dx} + (n)\frac{dp}{dy}$$

$$P_{(8,3)} = P_{(7,3)} + \frac{dp}{dx} + (n+1)\frac{dp}{dy}$$

$$P_{(9,3)} = P_{(8,3)} + \frac{dp}{dx} + (n+1)\frac{dp}{dy}$$

After the computation of parameter values for major edge points, each major edge point for each column is then used to calculate parameter values for pixels centers below the particular major edge point along a particular column. For example, the interpolation down column 4 (i.e., "C4"), yields $$P_{C4-1} = P_{(5,3)} = P_{(5,4)} - \frac{dp}{dy} \text{ and}$$

$$P_{C4-2} = P_{(5,2)} = P_{(5,3)} - \frac{dp}{dy}.$$

It is noted that the last major edge point shown in FIG. 6 which is at location 9,3 is actually outside of the down triangle; this will of course mean that no filling along column X=9 will occur and that this last major edge point will be discarded for purposes of filling the triangle.

A feature of the present invention allows for the computation of parameter values outside of the triangle to be used for computing parameter values within the triangle. FIG. 5 shows an example of this where the first pixel center is outside of the triangle and its parameter values are used to compute all other parameter values. As explained above, because of the "planar parameter surface" located conceptually above the triangle, this computation will still remain accurate in going from parameter values outside of the triangle to parameter values within the triangle. It should be noted that during this interpolation process, parameter values should not be clamped (i.e. they should be allowed to fluctuate over as wide a range as possible with the computer system being used). Preferably, fixed point arithmetic may be used during the process of the interpolation in order to prevent clamping by floating point systems in a computer system.

It will be appreciated that certain types of specialized graphics hardware may be used with the present invention. For example, parallel processing of each column separately by separate processors (after the calculation of parameter values for a major edge point on a column) may be used in order to more rapidly calculate the interpolated parameter values along each column. However, the method of the present invention may be performed with general purpose computer systems and does not require such specialized graphics processors or parallel processing. It will be appreciated that numerous modification to the method of the present invention are possible. For example, parameter values up or down a column (depending on whether the triangle is an up or down triangle) may be computed immediately after computing the parameter values for the major edge point on the column (rather than waiting for the calculation of parameter values for all major edge points). The implementation of this approach is readily within the capabilities of those with ordinary skill in the art upon reference to the method disclosed herein.

Figure 9:
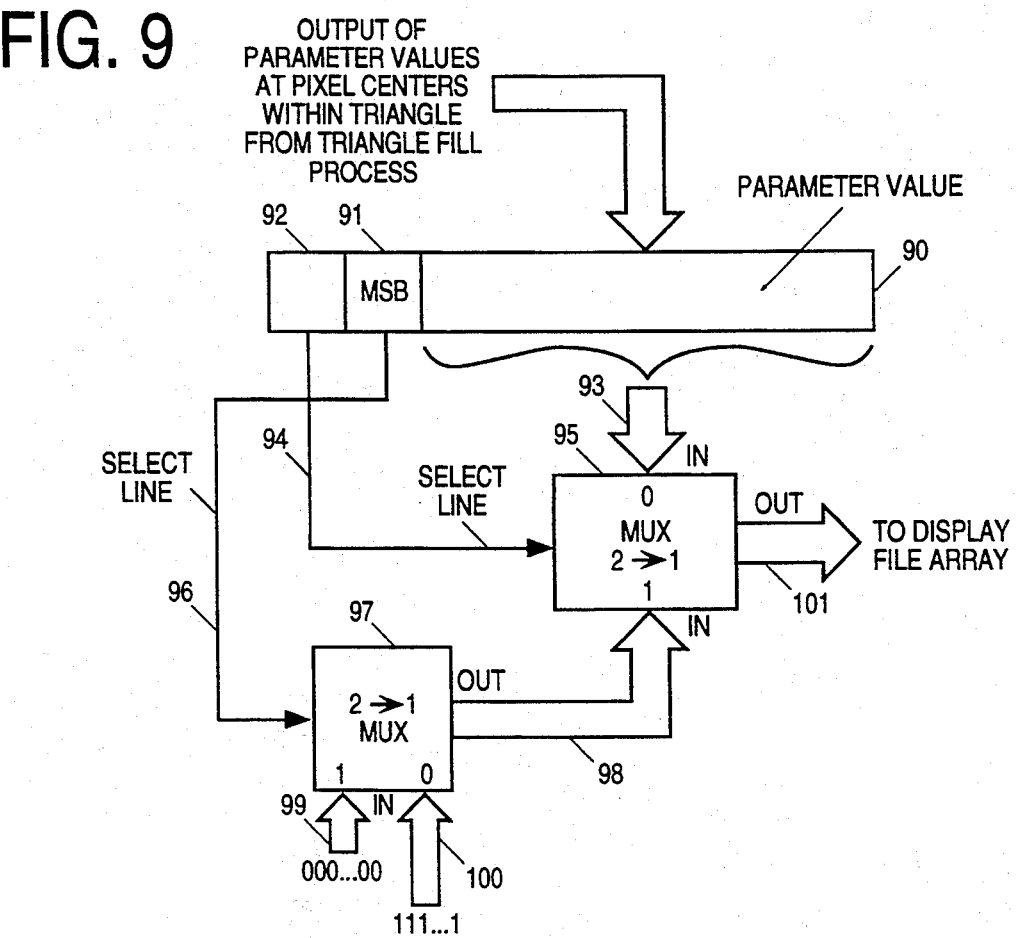
FIG. 9 shows an implementation of a hardware clamp of the present invention for performing scan conversion.

The method of the invention should not allow clamping of parameter values during interpolation, as described above, and specialized hardware may be used with the method of the present invention to assure that after obtaining all interpolated parameter values, these values are checked to determined whether they have gone beyond maxima or minima allowable values. An example of an implementation of this hardware for determining whether allowable maxima or minima have been exceeded is shown in FIG. 9. The register 90 is a multibit register which receives the output of each parameter value at pixel centers within the triangle from the triangle filling process of the present invention. The interpolation process uses an extra bit beyond the expected most significant bit (for each parameter value) and this extra bit is provided to the register 90 along with the rest of the parameter value. It will be appreciated that several such registers (and the other associated logic shown in FIG. 9) may be implemented for parallel receipt of the various parameter values for a pixel center. The parameter value is stored as a multibit value in register 90, where the most significant bit of the parameter value is stored in the bit register 91 which is part of the register 90. Register 90 also includes an overflow bit register 92 which will indicate whether or not the parameter value has overflowed beyond the allowable maxima or minima. The value of the overflow indicator bit in register 92 provides a signal over the select line 94 of the multiplexor 95, which signal selects between the two inputs from buses 93 or 98 to the multiplexor 95. Specifically, if the value of the overflow indicator bit in register 92 is a zero, then the parameter value, including the most significant bit (MSB) of the parameter value in register 91, is provided over bus 93 and out of multiplexor 95 via bus 101. In other words, if the overflow indicator bit in register 92 is a zero, then the parameter value is selected by the multiplexor 95 for output. If on the other hand, the overflow indicator bit is a one, then the value selected by multiplexor 97 is provided at the output of multiplexor 95. The output of multiplexor 97 is selected on the basis of the status of the select line 96 which is coupled to receive the value of the most significant bit of the parameter value as stored in location 91. If the most significant bit is a one, then the input 99 to multiplexor 97 is selected for output by MUX 97. Conversely, if the most significant bit in location 91 is a zero, then the input 100 is selected as the output of multiplexor 97. As shown in FIG. 9, the input 99 is all zeros while the input 100 is all ones. It will be appreciated that if the most significant bit is a one when an overflow condition occurs then the proper value of the parameter is most likely all zeros, which are selected by the multiplexor 97 and then by the multiplexor 95 for output from multiplexor 95. If an overflow condition occurs when the most significant bit is a zero, then the most likely parameter value will be all ones (input 100 to multiplexor 97) which is provided as the output of multiplexor 95.

Figure 8A:
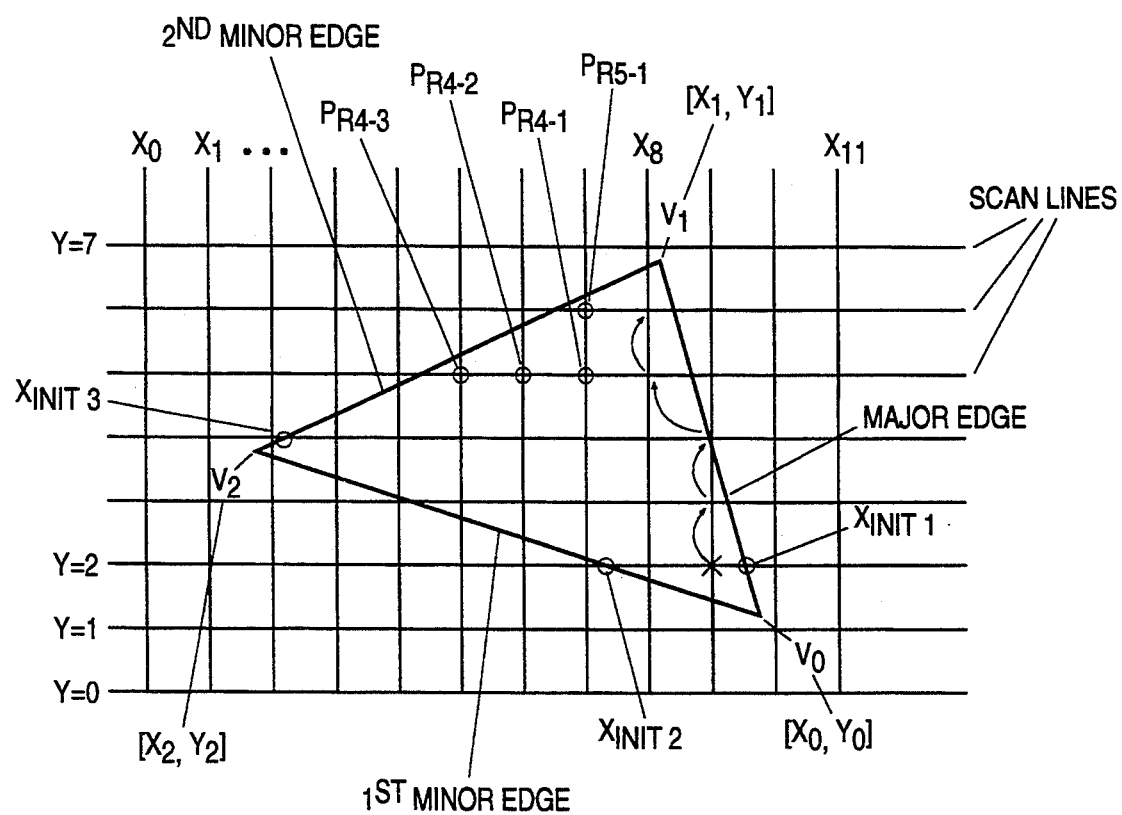
FIG. 8A shows a "left" triangle which is being scan converted according to the present invention and further shows the values along the major edge as well as interpolated values along certain rows.

An example of the scan converting and filling process of the present invention in the context of triangles which are filled along scan lines ("rows") rather than columns will now be described with reference to FIGS. 8A and 8B. Triangles filled along rows are referred to as "row triangles" and triangles filled along columns are referred to as "column triangles." FIG. 8A shows a "left" triangle having a major edge between vertices V0 and V1 and a second minor edge between vertices V2 and V1 and a first minor edge between vertices V2 and V0. It can be seen that $X_{first}=9$ and $Y_{first}=2$. According to FIG. 8A: dxfirst=$X_\Delta$=−0.8, dyfirst=$Y_\Delta$=0.9, $$n = \text{Fix}\left(\frac{dx1}{dy1}\right) = -1,$$

and n=Fix (dx dy 1). The first pixel location, representing the first major edge point is at 9,2 and there are four other major edge points which are determined in sequence from the first major edge point. These five major edge points are: (9,2), (9,3), (9,4), (8,5), and (8,6). The major edge is determined by finding the pair of vertices with the largest difference in their values of Y (in the case of a tie, pick one pair). The triangle of FIG. 8A is a left triangle because the vertex (shown as V2) which is not part of the pair of vertices specifying the major edge is to the left of the major edge. The values along the major edge for the major edge points are shown in FIG. 8A and are calculated in essentially the same manner as the parameter values along the major edge points for the down triangle discussed previously. The equations are given in Table 3 below.

TABLE 3

Equations for Values Along the Major Edge $P_{(9,2)} = P_{(X0,Y0)} + \frac{dp}{dx} X_\Delta + \frac{dp}{dy} Y_\Delta$ $P_{(9,3)} = P_{(9,2)} + \frac{dp}{dy} + (n + 1)\frac{dp}{dx}$ $P_{(9,4)} = P_{(9,3)} + \frac{dp}{dy} + (n + 1)\frac{dp}{dx}$ $P_{(8,5)} = P_{(9,4)} + \frac{dp}{dy} + (n)\frac{dp}{dx}$ $P_{(8,6)} = P_{(8,5)} + \frac{dp}{dy} + (n + 1)\frac{dp}{dx}$ In practice, the computations for row triangles are the mirror image of computations for column triangles because "x" is substituted for all "y's" in column computations and "y" is substituted for all "x's" in column computations. Thus, for example, the equation for "tmp" for a row triangle is:

$$\begin{aligned}tmp &= (dy1)(dx2) - (dy2)(dx1)\\ &= (y1 - y0)(x2 - x0) - (y2 - y0)(x1 - x0)\end{aligned}$$

Also shown below are examples of equations for a row triangle which were derived (by the substitution of x for y and y for x) from the corresponding column triangle equation:

tmp 0=dx2*R
tmp1=dx1*R
drdy=(tmp0*dr1)−(tmp1*dr2)
drdx=(tmp1*dr2)−(tmp0*dr1)
dxdy1=(dx1)*(1/dy1); dxdy2=dy2(1/dy2);
dxdy3=dx3(1/dy3);
yfirst=float (fix(y0+0.99 . . . ))
dyfirst=yfirst−y0
xinit1=x0+dxdy1*dyfirst
if left triangle (tmp<0): xfirst=float (fix(xinit1−ALMOSTZERO))
if right triangle (tmp>0): xfirst =float (fix(xinit1+0.99 . . . ))
dxfirst=xfirst−x0
n=float(fix(dxdy1))
xinit2=x0+dxdy2(dyfirst)
xinit3=x2+dxdy3[float(fix(y2+0.99 . . . ))−y2]

It will also be appreciated that the equations used in the various steps of FIGS. 7a through 7h will be similarly modified (substituting x for y and y for x) in order to account for the geometry of a row triangle. Since $$\frac{dp}{dx}$$

is subtracted from parameter values in interpolating left along a row in a left triangle, a left triangle is analogous to a down triangle (where $$\frac{dp}{dy}$$

is subtracted interpolating down a column).

The interpolation along each scan line (which is an orthogonal axis of the display device) occurs after the parameter values for the major edge point on that scan line have been computed. In the case of the left triangle, the interpolation proceeds by subtracting dp/dx from the last parameter value. For instance, the calculation of the parameter values are given as:

$$P_{R5-1} = P_{(8,6)} - \frac{dp}{dx}\,; P_{R4-1} = P_{(8,5)} - \frac{dp}{dx}\,;$$

$$P_{R4-2} = P_{R4-1} - \frac{dp}{dx}\,; \text{and } P_{R4-3} = P_{R4-2} - \frac{dp}{dx}$$

FIG. 8B generally illustrates the method of the invention for triangles having parameter values which are interpolated along scan lines. The parameter values for the triangle's vertices are received in step 500 and then the major edge of the triangle is determined in step 501, as well as the determination of whether the triangle is a left triangle or a right triangle. A right triangle has a positive value for tmp, and the vertex which is not part of the major edge is to the right of the major edge. A left triangle has a negative value for tmp, and the vertex (shown as V2) which is not part of the major edge is to the left of the major edge. In step 502, the parameter values for the first pixel center adjacent to the major edge are computed. In the case of the left triangle shown in FIG. 8A, the value at location 9,2 is calculated according to the equation shown in FIG. 8A. Then, in step 503, the process moves up to the next scan line and the process picks the next pixel center along the major edge; this continues until each scan line intersecting the major edge is provided with a major edge point along the scan line. At each new major edge point, the parameter values are calculated in step 504 according to the method of the present invention utilizing the equations shown in FIG. 8A. Then processing proceeds to step 505 where parameter values are interpolated along each scan line containing a major edge point. The interpolation of parameter values along each scan line containing a major edge point proceeds in a normal fashion, including a test to determine whether the pixel center is within the triangle. It will be appreciated that scan line intersections with the edges will be utilized to determine the maximum left and right values for the interpolation process and to test if pixel centers are within the triangle. The testing step 507 determines whether the last row has had its pixel centers interpolated and if not processing loops back to step 505 until all scan lines having pixel centers within the triangle are interpolated.

After completing all interpolations of pixel centers within the triangular polygon, the values for the parameters of all pixel centers within the polygon may then be assembled in a display file for transfer to the frame buffer where conventional operations may be performed, such as hidden surface algorithms utilizing the Z values and other well known graphics techniques. Alternatively, the parameter values may be filtered according to conventional anti-aliasing techniques in order to improve the appearance of the polygons, particularly the edges of the polygons. Thus, as shown in FIG. 2, after completing the scan conversion and filling process of the present invention, in step 203, the parameter values may be sent to the frame buffer for display or alternatively filtering of the parameters values may be performed based upon the determination of the coverage of each pixel center by the particular polygon. These steps are illustrated in steps 204 and 205. An aspect of the present invention includes an improved method for determining the coverage by a polygon of a particular pixel and this technique may be included into the interpolation method described above so that coverage is determined for each pixel center within the polygon during the filling process.

Figure 10A:
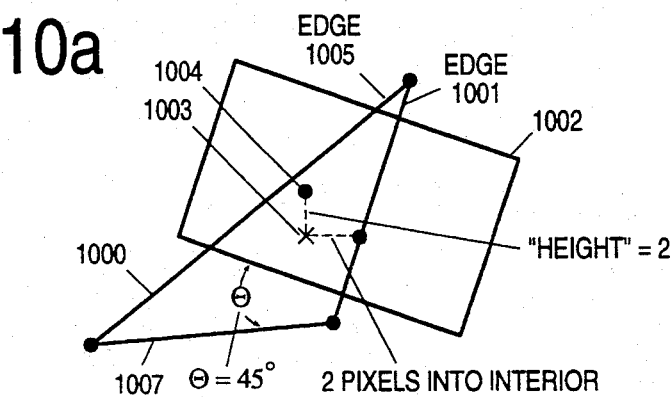
FIG. 10A conceptually shows the method of determining the coverage of a particular pixel based upon its relationship with a plane.
Figure 10B:
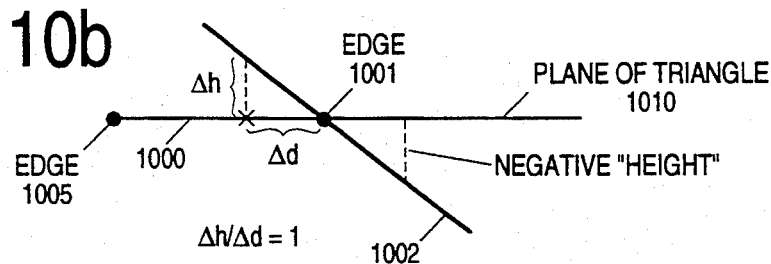
FIG. 10B shows the triangle of FIG. 10A on edge to further illustrate the concept of determining coverage according to the present invention.

The method of determining the coverage of a pixel by a polygon will now be described by referring to FIGS. 10A and 10B. Conceptually, imagine the plane of a triangle being intersected at one of its edges by a plane having a slope of one relative to the plane of the triangle. This is shown in figure 10A wherein the triangle 1000 is intersected at its edge 1001 by the plane 1002. Plane 1002 includes the edge 1001 and has an angle with respect to the plane of the triangle of 45 degrees (equivalent to a slope of one). Point 1003 is within the plane of the triangle and is a pixel center within the triangle. Point 1004 is a point in the plane 1002. It is clear that the "height" from the point 1003 to the point 1004 is two and that the distance from the edge 1001 to the point (pixel center) 1003 is also two (therefore, pixel center 1003 is two pixels into the interior of triangle 1001). FIG. 10B shows another view of the triangle 1000 and the plane 1002. This view is taken from on the edge of triangle 1000 looking down edge 1007. From this view, edges 1001 and 1005 appear as points and the plane 1002 appears as a line. It can be seen from this view that the height between the two planes and the distance of the pixel from the edge will be equivalent because the slope is equal to one. The height will have a negative value if measured from a point outside of the triangle. This height is an approximation of the coverage by the polygon of the particular pixel center and it is a value representative of the distance of the pixel center from the edge which intersects the plane. It will be appreciated that a higher height indicates that it will be less likely to filter the parameter value of the pixel center.

One method of determining this height is to compute and sample at each pixel center which is to be filled two plane equations, one representing the plane 1002 and the other representing the plane 1010, which is the plane of the triangle 1000. These two planes will have a slope with respect to each other of one. For each pixel center within the polygon, the distance between the two planes is computed and this provides a value for each pixel center which is proportional to (and a function of) the distance from the pixel center to the edge which intersects the plane 1002. This step is repeated for each edge so that each pixel center has a measure of distance relative to each edge of the polygon. These measures of distance are then used according to the process of the present invention to provide an estimate of the coverage by the polygon of the particular pixel. Other methods for determining the distance are discussed below.

Figure 11A:
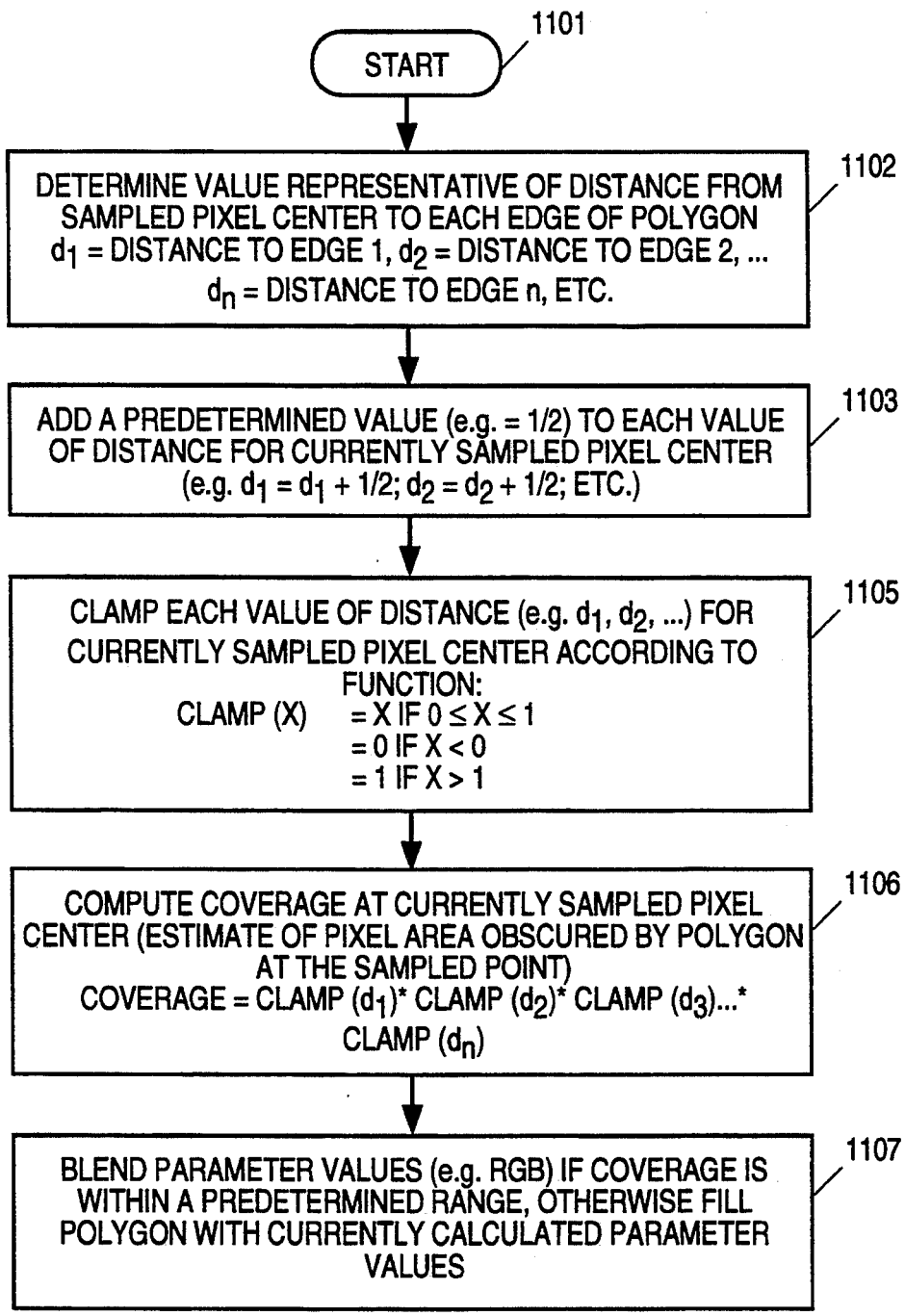
FIG. 11A shows a flow chart for a general method for determining the coverage of a pixel area by a polygon at a sample point.

A general method of the present invention for determining the coverage by a polygon of a pixel will be described while referring to FIG. 11A. It will be appreciated that the method of the present invention for determining coverage is applicable to triangular polygons as well as non-triangular polygons, such as the quadrilateral polygon shown in FIG. 13. The method begins in step 1101 which may be either after filling pixel centers within the polygon or during the process of filling pixel centers within the polygon. In step 1102, the process determines a value representative of (and proportional to) the distance from the currently sampled pixel center to each edge of the polygon. The distance d1 represents a function of the distance to edge 1, the distance d2 represents a function of the distance to edge 2, and the distance dn represents a function of the distance to edge n. These distance values may be proportional to (but not equal to) the actual distance, depending on the slope of the plane which intersects the edge. If the slope is one, then the height will equal the actual distance to the edge ( as shown in FIG. 10B). However, if the height value is computed according to a plane (which intersects the edge to which the distance value is being computed) which has a slope of other than 1, then the distance value represented by the computed height will be proportional to (but not equal to) the actual distance to the edge. For example, in FIG. 14 a plane 1020 (which intersects edge 1001) has a slope of two relative to the plane 1010 which is the plane of the triangle 1000. In this case, the distance value represented by the computed height will be twice the actual distance (from the point in the triangle to the edge), and the edge will appear (after blending) sharper. In the preferred embodiment, the slope of the plane (which intersects the edge of the polygon) is 1. If a slope less than 1.0 is used, then more blurry filtering (blending) is achieved. In step 1103, a predetermined value is added to each value representing distance for the currently sampled pixel center. In the currently preferred embodiment of the present invention, the predetermined value is 0.0, although other values (e.g. 0.5, etc.) may be chosen. The predetermined value which is added to the value representing distance in step 1103 is added to handle situations where pixel centers are close to the edge. Pixel centers close to an edge (e.g. pixel center at 5,3 of FIG. 5) will have height values of less than 1 and thus will tend to produce clamped functions of less than one (resulting in more blending at these pixel centers); adding the predetermined value tends to increase the coverage of these pixel centers. A predetermined value which is closer to zero will tend to shrink the polygon. In step 1105, each value representative of distance (as modified by step 1103) is then clamped for the currently sampled pixel center according to a function which clamps the output of the function to a predetermined value (e.g. 1) if the input to the function is outside of a predetermined range. In the preferred embodiment, the value representative of the distance is clamped to the value of one if the input to the function is greater than one. Also in the preferred embodiment, the value of the clamp function is zero if the value of the input to the function is less than zero. In the preferred embodiment, the value of the clamp function is equal to the input to the function if the input is within a range of zero to one, inclusive.

Following the clamping step in 1105, the value of the coverage is computed in step 1106 by multiplying all output values of each clamped distance function. Then in step 1107, the parameter values (e.g. RGB) are blended according to conventional prior art techniques if the coverage is within a predetermined range and otherwise the polygon is filled with the currently calculated parameter values which remain unblended. In the currently preferred embodiment, the predetermined range for blending is: $0 < \text{coverage} < 1$. In other words, blending will occur if the value of coverage is between 0 and 1 (not including the extremes of that range). If the value for coverage is equal to 0 then no filling of the pixel will occur and if the value of the coverage is equal to 1, then the polygon is filled at that pixel location with the currently calculated parameter value which remains unblended. Blending is performed using well known pixel blending techniques which use, as an input, the value of the coverage of a pixel. For example, a simple blending technique for a gray scale display device may involve multiplying the gray scale parameter for a pixel by the coverage of the pixel. Thus, if the coverage=0.5, then the blended pixel value is one-half of the original, unblended gray scale value.

A specific method of the present invention of determining pixel coverage will now be described by referring to FIGS. 11B and 12. This method performs the computation of coverage and blending during the interpolation process of the present invention and utilizes the same interpolation techniques used for scan converting and filling triangular polygons. The three distances of a point to the three edges of the triangle are treated as three separate parameters which are interpolated according to the method shown in FIG. 7 above. FIG. 12 shows an up triangle having vertices V0, V1 and V2. Vertex V0 has the coordinate location of X0, Y0, vertex V1 has the coordinates X1, Y1, and vertex V2 has coordinates X2, Y2. It is defined that $X_{first}$ is 2, $Y_{first}$ is 4, $X_A = dxfirst = 0.3$, $Y_A = dyfirst = 0.2$, and $n = -1$. In addition, it is given that A at V0=0; B at V0=$B_0$; C at V0=0; A at V1=0; B at V1=0; C at V1=$C_0$; A at V2=$A_0$; B at V2=0; and C at V2=0. This method of the present invention is based upon the observation that the plane which intersects an edge of the triangle, which plane has a slope of one relative to the plane of the triangle, will have a height (above the triangle at the opposing vertex) which is equal to the distance from the opposing vertex to the edge. Thus, each vertex has a value representative of the height of the three planes above that vertex. Thus, for example, the plane having a slope one and intersecting edge B will have a height above vertex V0 of B0 (while vertices V1 and V2 have a height equal to zero relative to this plane). It can be seen that this plane is associated with the parameter value B which represents the function of the distance from a point to the edge B; notice that vertices V1 and V2 have a distance of zero. As shown in FIG. 12, the parameter A represents the distance from a point to edge A, B represents the distance from a point to edge B and the parameter C represents the distance from a point to edge C. $B_0$ is defined as the distance from vertex $V_0$ to edge B. The value of B0 may be derived in various ways, including the method described previously of computing the two plane equations and then determining the distance between vertex V0 in the plane of the triangle and the corresponding point in the plane which intersects edge B. An alternative method for computing B0 is the method described in conjunction with FIG. 13, which computes the intersection on edge B of the perpendicular line containing the vertex V0, which line is perpendicular with respect to the edge B. The three parameter values A, B and C are shown at the three vertices in FIG. 12; A0 is the distance from V2 to edge A, and C0 is the distance from V1 to edge C.

Figure 11B:
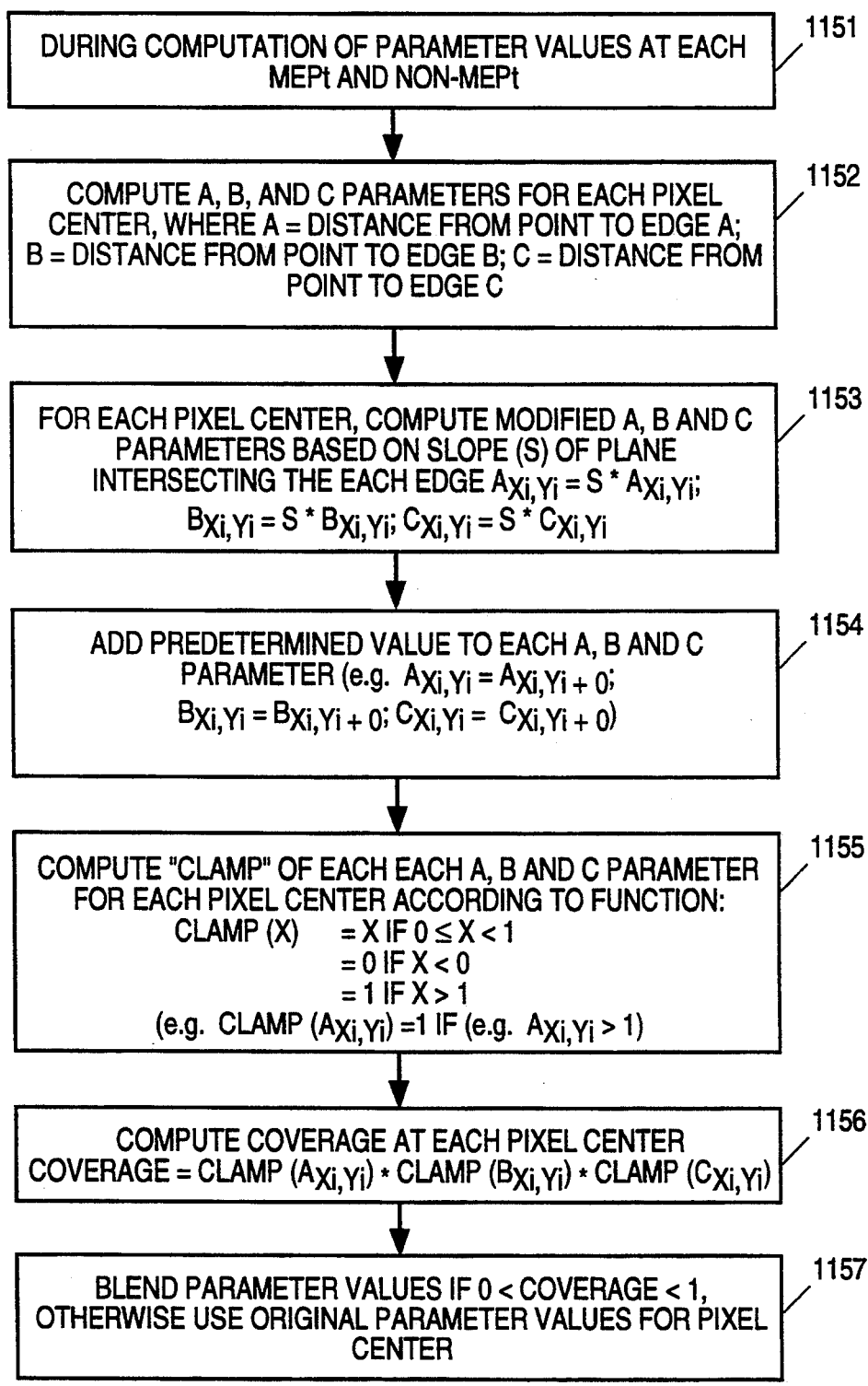
FIG. 11B shows an alternative embodiment for determining the coverage of a pixel according to the interpolation method of the present invention.
Figure 12:
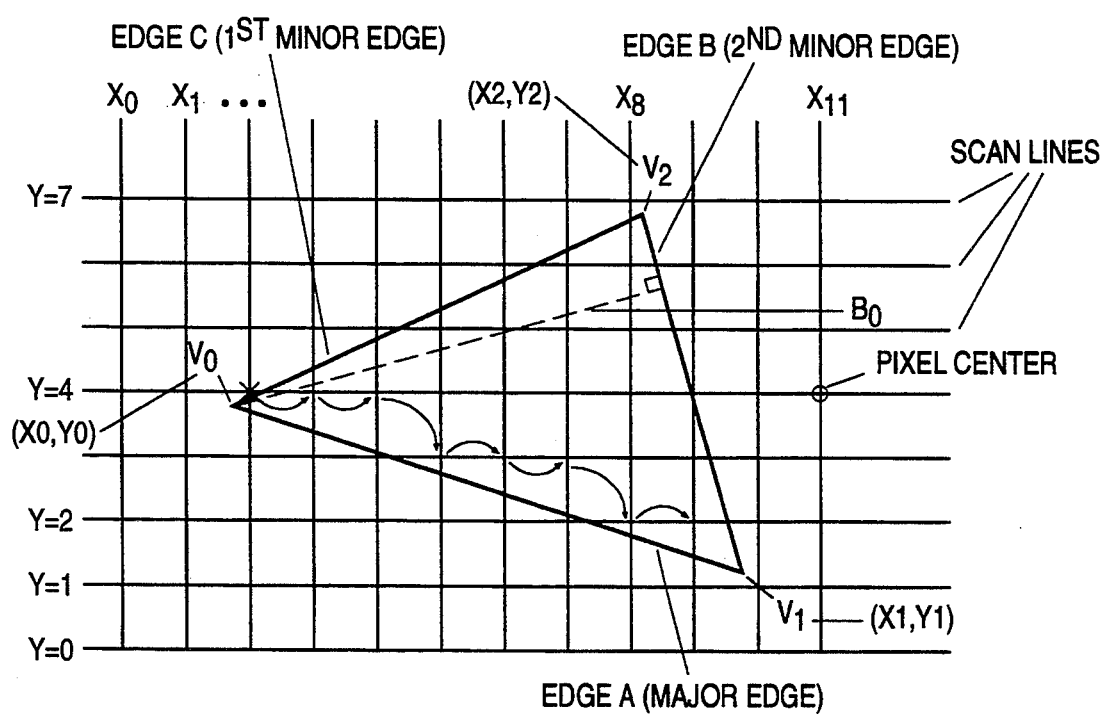
FIG. 12 shows a triangular polygon which illustrates the alternative method of FIG. 11B for determining the coverage of a pixel center by a polygon.

FIG. 11B shows the method of determining pixel coverage during the interpolation process of the present invention. As can be seen from FIG. 12, the interpolation of pixel coverage values is performed in the manner shown in FIGS. 7a through 7h except that the parameter slopes for A, B and C with respect to X and Y are computed as shown in FIG. 12 (rather than as shown in conjunction with steps 604 and 605 of FIG. 7). Moreover, in step 1152 of FIG. 11B, the computation of Afirst, Bfirst and Cfirst (for the first major edge point) is performed as shown in FIG. 12 (rather than as shown in step 605 and in FIG. 5). The process of FIG. 11B is executed each time parameter values are computed in the method of FIGS. 7a through 7h, including steps 605, 617, 618, 639, 697, 763 and 819. Table 4 lists the equations describing the A, B and C parameters values for the major edge points.

TABLE 4

| Equations for Values Along the Major Edge |
|---|
| $A_{first} = A_{(2,4)} = (dAdx)X_A + (dAdy)Y_A$ |
| $A_{(3,4)} = A_{(2,4)} + dAdx + (n + 1) dAdy$ |
| $A_{(4,4)} = A_{(3,4)} + dAdx + (n + 1) dAdy$ |
| $A_{(5,3)} = A_{(4,4)} + dAdx + (n) dAdy$ |
| $A_{(6,3)} = A_{(5,3)} + dAdx + (n + 1) dAdy$ |
| $A_{(7,3)} = A_{(6,3)} + dAdx + (n + 1) dAdy$ |
| $A_{(8,2)} = A_{(7,3)} + dAdx + (n) dAdy$ |
| $A_{(9,2)} = A_{(8,2)} + dAdx + (n + 1) dAdy$ |
| $B_{first} = B_{(2,4)} = B_0 + (dBdx)X_A + (dBdy)Y_A$ |
| $B_{(3,4)} = B_{(2,4)} + dBdx + (n + 1) dBdy$ |
| $B_{(4,4)} = B_{(3,4)} + dBdx + (n + 1) dBdy$ |
| $B_{(5,3)} = B_{(4,4)} + dBdx + (n) dBdy$ |
| $B_{(6,3)} = B_{(5,3)} + dBdx + (n + 1) dBdy$ |
| $B_{(7,3)} = B_{(6,3)} + dBdx + (n + 1) dBdy$ |
| $B_{(8,2)} = B_{(7,3)} + dBdx + (n) dBdy$ |
| $B_{(9,2)} = B_{(8,2)} + dBdx + (n + 1) dBdy$ |
| $C_{first} = C_{(2,4)} = (dCdx)X_A + (dCdy)Y_A$ |
| $C_{(3,4)} = C_{(2,4)} + dCdx + (n + 1) dCdy$ |

TABLE 4-continued

Equations for Values Along the Major Edge $C_{(4,4)} = C_{(3,4)} + dCdx + (n + 1) dCdy$
$C_{(5,3)} = C_{(4,4)} + dCdx + (n) dCdy$
$C_{(6,3)} = C_{(5,3)} + dCdx + (n + 1) dCdy$
$C_{(7,3)} = C_{(6,3)} + dCdx + (n + 1) dCdy$
$C_{(8,2)} = C_{(7,3)} + dCdx + (n) dCdy$
$C_{(9,2)} = C_{(8,2)} + dCdx + (n + 1) dCdy$ The parameters for the pixel centers are determined through interpolation. For example, interpolating up column X=5 yields: $A_{(5,4)}=A_{(5,3)}+dAdy$; $A_{(5,5)}=A_{(5,4)}+dAdy$; $B_{(5,4)}=B_{(5,3)}+dBdy$; $B_{(5,5)}=B_{(5,4)}+dBdy$; $C_{(5,4)}=C_{(5,3)}+dCdy$; and $C_{(5,5)}=C_{(5,4)}+dCdy$.

After computing the A, B and C parameter values for each pixel center, the following distance parameter slope equations are utilized.

$$dAdx = \frac{-dy1}{\sqrt{(dx1)^2 + (dy1)^2}} \quad dAdy = \frac{dx1}{\sqrt{(dx1)^2 + (dy1)^2}}$$

$$dBdx = \frac{-dy3}{\sqrt{(dx3)^2 + (dy3)^2}} \quad dBdy = \frac{dx3}{\sqrt{(dx3)^2 + (dy3)^2}}$$

$$dCdx = \frac{dy2}{\sqrt{(dx2)^2 + (dy2)^2}} \quad dCdy = \frac{-dx2}{\sqrt{(dx2)^2 + (dy2)^2}}$$

where $dx1 = X1 - X0 \quad dy1 = Y1 - Y0$
$dx2 = X2 - X0 \quad dy2 = Y2 - Y0$
$dx3 = X2 - X1 \quad dy3 = Y2 - Y1$ Processing proceeds to step 1153 in which the three parameters A, B and C may be modified according to the slope of the plane intersecting each edge, as shown in step 1153. In the preferred embodiment, the slope is equal to one and thus there is no modification of these parameters. In step 1154, a predetermined value is added to each of the three parameters for each pixel center. In the preferred embodiment, this predetermined value is 0.0. Then in step 1155, the clamp function of each of the three parameters A, B and C is computed for each pixel center according to the clamp function specified in step 1155. In particular, the clamp function provides the value of the input if the input is within a predetermined range, which is typically zero to one, inclusive. The clamp function returns the value of zero if the input is less than zero, and the clamp function returns the value of one if the input is greater than one.

In step 1156, the coverage at each pixel center is computed by multiplying the clamp function of each of the three parameters A, B and C for the particular pixel center. Finally, parameter values are blended if the coverage falls within a predetermined range as shown in step 1157.

Figure 13:
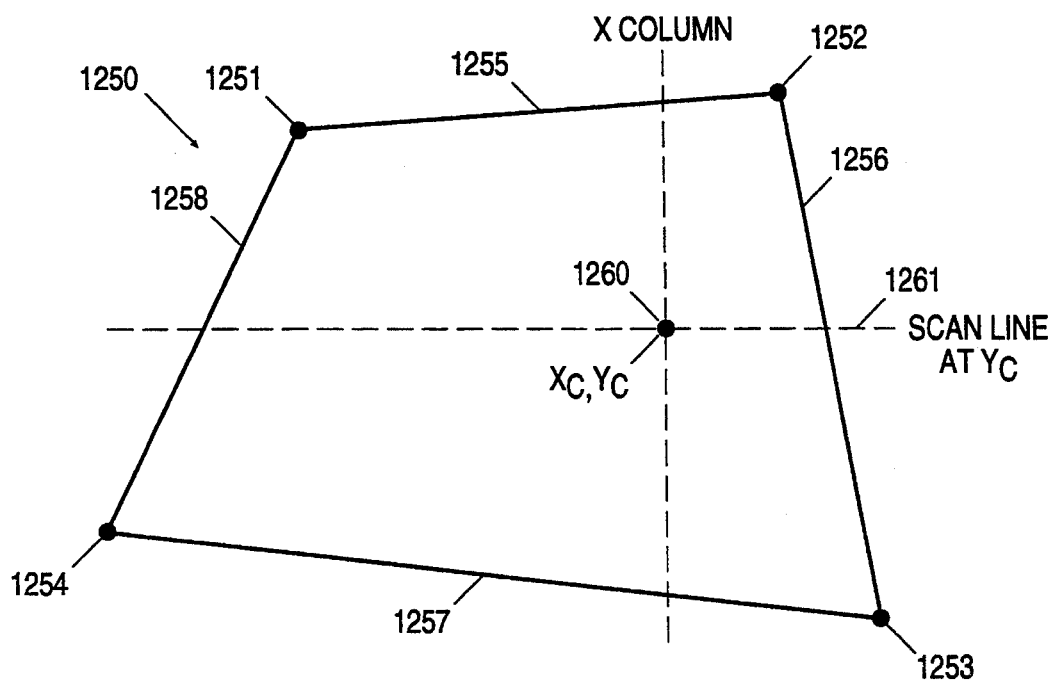
FIG. 13 shows a quadrilateral and a pixel center within the quadrilateral for which the coverage of that pixel center is being determined according to another embodiment of the present invention for determining the coverage of a pixel by a polygon.
Figure 14:
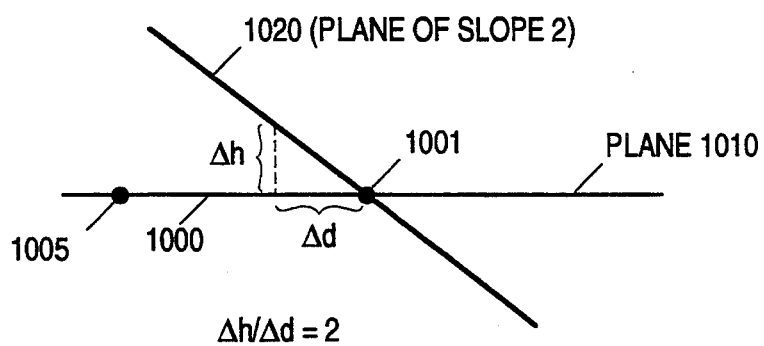
FIG. 14 shows a triangle (of FIG. 10) on edge to illustrate the variation of the slope of the plane over the triangle.

The method of determining pixel coverage by a polygon, including an N sided polygon, where N exceeds three, may be described generally with reference to FIG. 13. FIG. 13 shows a quadrilateral polygon having vertices 1251, 1252, 1253 and 1254 which form edges 1255, 1256, 1257 and 1258. This polygon 1250 is shown in an output device coordinate space having a scan line at YC, which scan line has been labeled 1261. The intersection of the current X column with the scan line 1261 finds the pixel center XC, YC for location 1260. A method will now be described for the general computation of the distance from a pixel center within a polygon to any edge of the polygon. This distance may then be used as part of the process shown in FIG. 11A to determine the coverage by the polygon of the particular pixel. This method attempts to find the line through the current pixel center to the particular edge, which line is perpendicular with respect to that edge. It is known that such a line will have a slope which is the negative reciprocal of the slope for the particular edge. If the slope of the edge is zero or infinity (division by zero) then the calculation is simplified. If the slope of the edge is zero then the line of the edge is horizontal and therefore the distance is equal to the absolute value of the quantity (Y value at one of the vertices of the edge minus the Y value at the current pixel center). If the edge has an infinite slope then the edge is vertical and the distance to the edge from the current pixel center is simply the absolute value of the quantity (X of one of the vertices minus XC). If neither of these situations is the case, then the value for B (from the equation Y=MX+B) for the line which perpendicularly intersects the edge is computed, as follows:

$$B_C = M_C X_C - Y_C$$

It will be appreciated that XC and YC are known and that MC is the negative reciprocal of the slope of the edge to which the distance is being calculated. After determining $B_C$, then two equations are simultaneously solved for the value of the intersection point (XI, YI) on the edge with the perpendicular line. Specifically, the simultaneous solution of $Y=M_C X+B_C$ and $Y=-M_E X+B_E$ is calculated (where ME is the slope of the edge) It will be appreciated that $$B_E = Y_{\nu 1} - \frac{(Y_{\nu 1} - Y_{\nu 0})}{(X_{\nu 1} - X_{\nu 0})} X_{\nu 1},$$

where $X_{\nu 1}$ and $Y_{\nu 1}$ are the X and Y coordinates at one vertex of the edge and Xvo and Yvo are the coordinates at the other vertex of the edge. The simultaneous solution gives the intersection point (XI, YI) of the perpendicular line with the edge which then permits the computation of the distance according to the standard Euclidean distance formula—distance$=((XI-XC)^2+(YI-YC)^2)^{\frac{1}{2}}$. This computation is performed for each perpendicular intersection with each edge from the point XC, YC. After all distances from that point to each edge are computed, then the method of the invention may be utilized to determine the coverage of the pixel at XC, YC by the polygon by performing steps 1103, 1105, and 1106 to determine the value of coverage. Then, in step 1107, conventional blending techniques may be utilized to filter the parameter values at the current pixel location.

It will be appreciated that other well known techniques for computing the distance of a pixel center to the edge of a polygon may be utilized in accordance with the present invention for determining the coverage of a pixel by a polygon. It will also be appreciated that other equivalent processing steps in the method for scan converting and filling a triangular polygon maybe substituted for the specific steps presented in FIGS. 7a through 7h. It should also be understood that the figures are for purposes of illustration only and should not be taken as limitations upon the invention. It is clear that the methods and apparatus of the present invention may be modified and changed in accordance with uses desired from the present invention. It is contemplated that many changes and modifications may be made by one of ordinary skill in the art without departing from the spirit and the scope of the invention.

I claim:

1. In a computer controlled display system with a processor and a scanned display device having an array of pixels, a computer implemented method for scan converting an arbitrarily positioned triangular polygon for display, wherein each pixel within said triangular polygon is set to a shade corresponding to parameter values stored in memory, said method comprising:

reading information representative of parameter values at each vertex of said triangular polygon;

selecting an edge of said triangular polygon to provide a selected edge;

calculating parameter values for a first pixel center adjacent to said selected edge, wherein said first pixel center may be on either side of said selected edge;

moving along said selected edge to a next pixel center adjacent to said selected edge;

calculating parameter values for said next pixel center adjacent to said selected edge;

repeating said steps of moving and of calculating parameter values for said next pixel center until all parameter values for pixel centers adjacent to said selected edge have been calculated;

for each line in a set of lines parallel to an orthogonal axis of said display device, interpolating parameter values for pixel centers on said line within said triangular polygon which have not been calculated, wherein said interpolating is performed according to parameter values determined in said calculating steps which correspond to pixel centers adjacent to said selected edge;

storing said parameter values in said memory;

reading said parameter values from said memory;

generating an electrical signal to actuate said pixels of said triangular polygon on the display device at shades indicated by said parameter values stored in said memory;

displaying said triangular polygon on said display device.

2. A method as in claim 1 wherein each of said lines is a column of said display device.

3. A method as in claim 2 wherein three of said parameter values represent the distance from a pixel center to each of the three edges of said triangular polygon.

4. A method as in claim 3 further comprising the step of determining a coverage of each pixel of said polygon according to a function of said three parameter values which represent distance.

5. A method as in claim 2 wherein said step of interpolating parameter values is performed after all parameter values for pixel centers adjacent to said selected edge have been calculated.

6. A method as in claim 2 wherein said step of interpolating parameter values is performed for a particular column after the parameter values for a pixel center adjacent to said selected edge on said particular column are determined and before the parameter values for all pixel centers adjacent to said selected edge are determined.

7. A method as in claim 2 wherein said step of selecting an edge to provide a selected edge comprises determining the pair of connected vertices which have the largest difference in their values of X.

8. A method as in claim 7 further comprising the step of determining whether said triangle is an up triangle or a down triangle, an up triangle having a vertex which is not part of said selected edge and which is above said selected edge, and wherein a down triangle has a vertex which is not part of said selected edge and which is below said selected edge.

9. A method as in claim 8 wherein said step of determining whether said triangle is an up or down triangle comprises calculating the signed area of said triangular polygon.

10. A method as in claim 9 wherein said signed area is provided by: $(X1-X0)(Y2-Y0)-(X2-X0)(Y1-Y0)$, where $X0,Y0$ are the coordinates of one vertex of said selected edge and $X1, Y1$ are the coordinates of the other vertex of said selected edge, where $X0$ is less than $X1$, and $X2, Y2$ are the coordinates of the vertex which is not part of the selected edge.

11. A method as in claim 1 wherein each of said lines is a scan line of said display device.

12. A method as in claim 11 wherein three of said parameter values represent the distance from a pixel center to each of the three edges of said triangular polygon.

13. A method as in claim 12 further comprising the step of determining a coverage of each pixel of said polygon according to a function of said three parameter values which represent distance.

14. A method as in claim 11 wherein said step of interpolating parameter values is performed for a particular scan line immediately after the parameter values for a pixel center adjacent to said selected edge on said particular scan line are determined.

15. A method as in claim 11 wherein said step of selecting an edge to provide a selected edge comprises determining the pair of connected vertices which have the largest difference in their values of Y.

16. A method as in claim 15 further comprising the step of determining whether said triangle is a left triangle or a right triangle, wherein a left triangle has a vertex which is not part of said selected edge and which is to the left of said selected edge, and wherein a right triangle has a vertex which is not part of said selected edge and which is to the right of said selected edge.

17. A method as in claim 16 wherein said step of determining whether said triangle is a left or right triangle comprises calculating the signed area of said triangular polygon.

18. A method as in claim 17 wherein said signed area is provided by: $(Y1-Y0)(X2-X0)-(Y2-Y0)(X1-X0)$, where $X0, Y0$ are the coordinates of one vertex of said selected edge and $X1, Y1$ are the coordinates of the other vertex of said selected edge, where $Y1$ is greater than $Y0$, and $X2, Y2$ are the coordinates of the vertex which is not part of the selected edge.

* * * * *